United States Patent
Fuse et al.

(10) Patent No.: US 7,884,845 B2
(45) Date of Patent: Feb. 8, 2011

(54) MINUTES TAKING SYSTEM, MINUTES TAKING METHOD, AND PROGRAM PRODUCT THEREFOR

(75) Inventors: Tohru Fuse, Tokyo (JP); Zhihua Zhong, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1185 days.

(21) Appl. No.: 11/518,142

(22) Filed: Sep. 11, 2006

(65) Prior Publication Data

US 2007/0188654 A1    Aug. 16, 2007

(30) Foreign Application Priority Data

Feb. 11, 2006  (JP) ............................. 2006-034605

(51) Int. Cl.
    *H04N 7/14* (2006.01)
(52) U.S. Cl. ................. 348/14.1; 348/14.08; 348/14.12
(58) Field of Classification Search ... 348/14.01–14.16; 382/305, 278, 282; 709/204, 205; 370/260, 370/261

See application file for complete search history.

(56) References Cited

U.S. PATENT DOCUMENTS

2007/0041666 A1*  2/2007  Nagamine et al. ........... 382/305

FOREIGN PATENT DOCUMENTS

JP      B2 3664132       4/2005
JP      A 2005-244523    9/2005

* cited by examiner

*Primary Examiner*—Melur Ramakrishnaiah
(74) *Attorney, Agent, or Firm*—Oliff & Berridge, PLC

(57) ABSTRACT

A minutes taking system includes a change detection portion that detects a change of a displayed image for a description object out of displayed images that are a plurality of stream images serving as information displayed in a conference, a separation detection portion that detects a separation temporally separates a content of the displayed image; and an extraction portion that extracts a recorded time segment to be recorded as minutes information composing a minutes, on the basis of a change time when the change detection portion detects the change of the displayed image for the description object and a separation time when the separation detection portion detects the separation according to the plurality of streams.

19 Claims, 19 Drawing Sheets

MINUTES TAKING SYSTEM, MINUTES TAKING METHOD, AND PROGRAM PRODUCT THEREFOR

BACKGROUND

1. Technical Field

This invention relates to a minutes taking system and a minutes taking method capable of taking a minutes having complementary information, and particularly to a minutes taking system and a minutes taking method capable of taking a minutes with which statement sound or the like as complementary information extracted based on a change time of a description object and a separation time of a description content is associated.

2. Related Art

A summary of a conference can be known from a minutes of the conference. However, it is not possible to know details of the conference from the minutes. When statement sound or the like in a conference is previously recorded and reproduced later, it is possible to know details of the conference and also recheck the conference. In this case, if sound of important statements can be previously extracted, a content of the conference can be effectively checked and a summary of the conference can be comprehended in a short time.

SUMMARY

An aspect of the present invention provides a minutes taking system including: a change detection portion that detects a change of a displayed image for a description object out of displayed images that are a plurality of stream images serving as information displayed in a conference; a separation detection portion that detects a separation temporally separates a content of the displayed image; and an extraction portion that extracts a recorded time segment to be recorded as minutes information composing a minutes, on the basis of a change time when the change detection portion detects the change of the displayed image for the description object and a separation time when the separation detection portion detects the separation according to the plurality of streams.

BRIEF DESCRIPTION OF THE DRAWINGS

Embodiments of the present invention will be described in detail based on the following figures, wherein.

DETAILED DESCRIPTION

Figure 1:
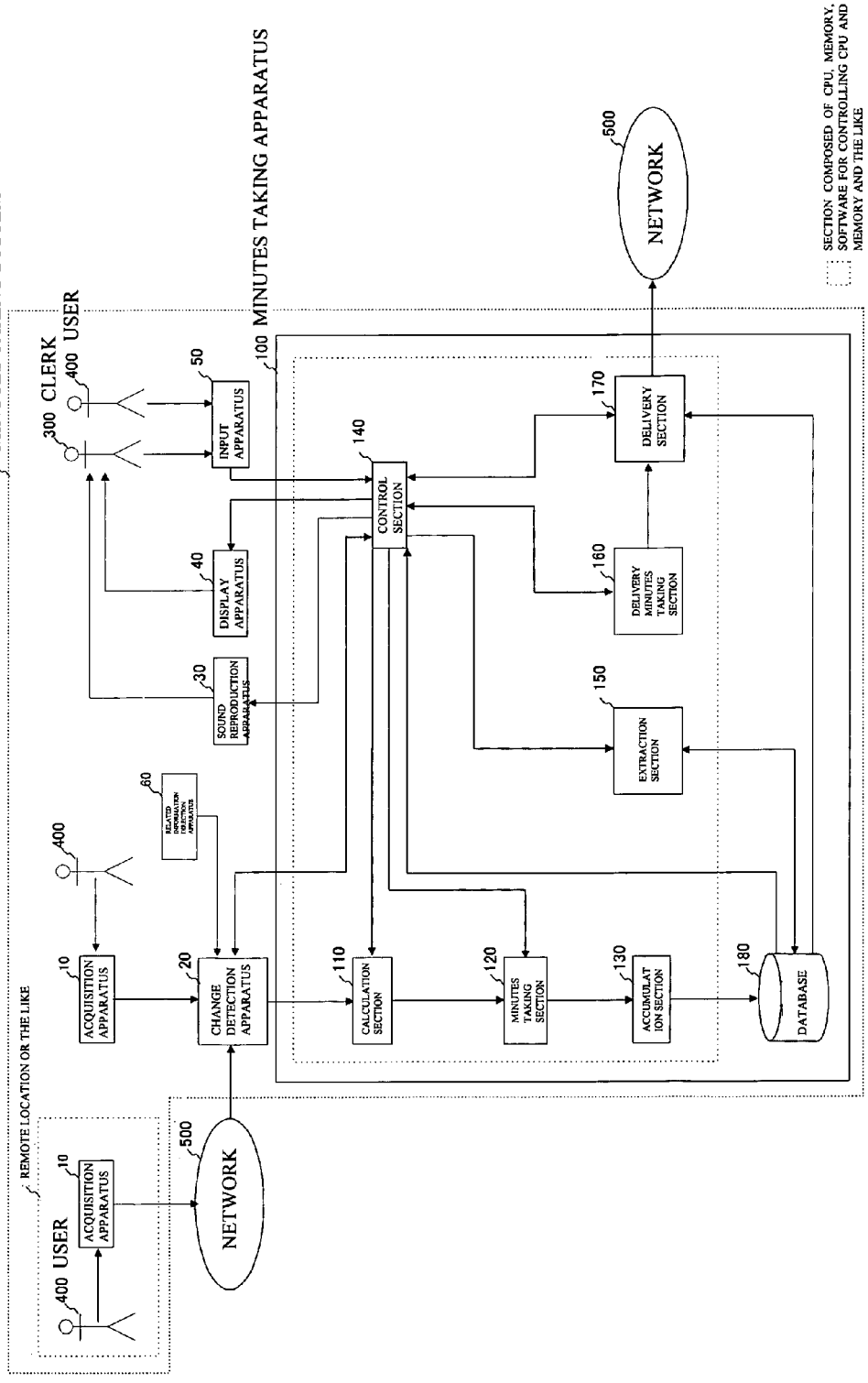
FIG. 1 is a structural diagram of a minutes taking system in accordance with an exemplary embodiment of the invention.

A description will now be given, with reference to the accompanying drawings, of exemplary embodiments of the invention. FIG. 1 is a structural diagram of a minutes taking system in accordance with an exemplary embodiment of the invention.

A minutes taking system 1 employed as an aspect of the invention is composed of multiple acquisition apparatuses 10, a change detection apparatus 20, a sound reproduction apparatus 30, a display apparatus 40, an input apparatus 50, and a minutes taking apparatus 100.

Figure 2:
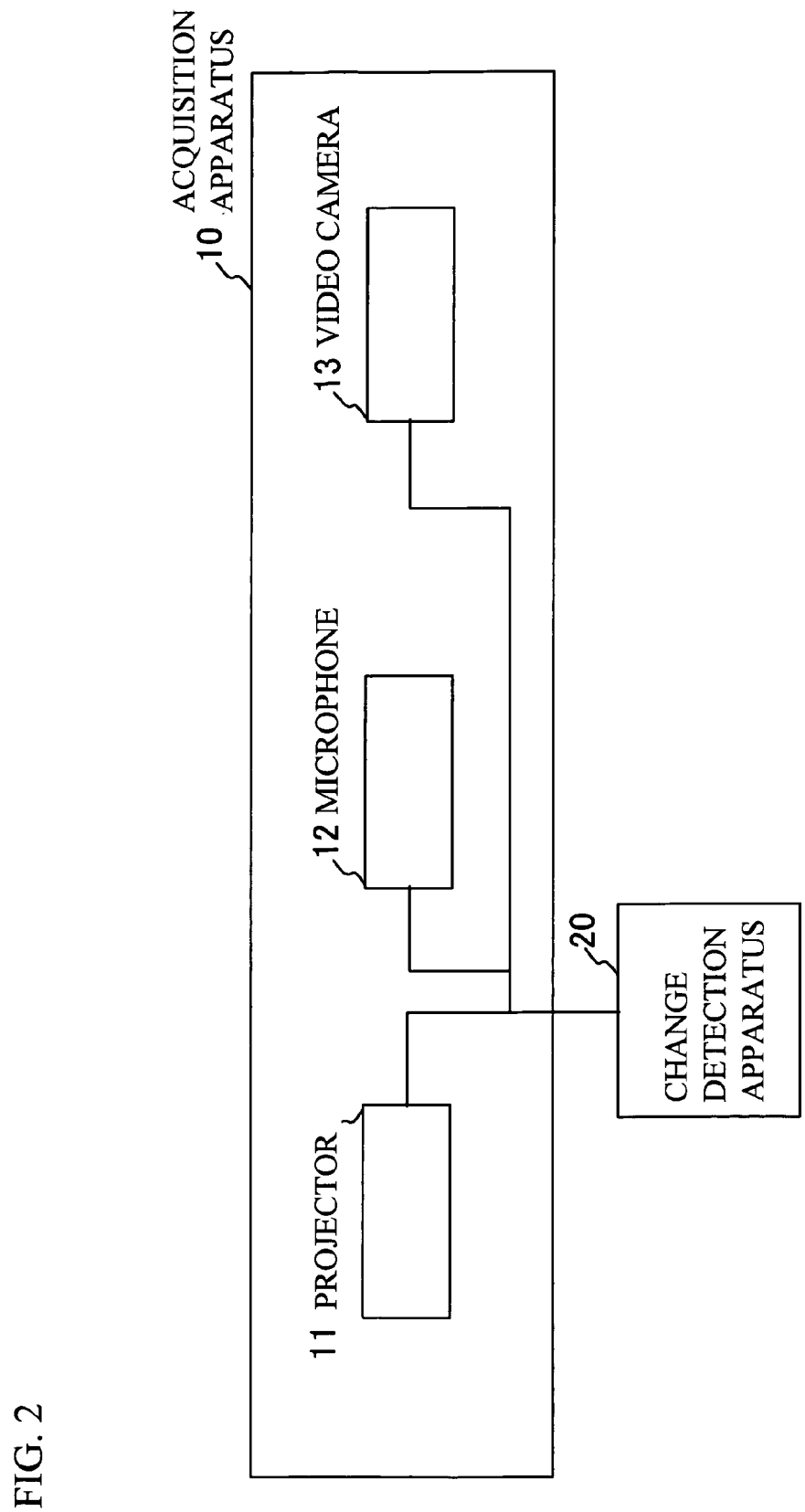
FIG. 2 is a diagram for explaining a structure of an acquisition apparatus.

First, a description will be given of an example of a structure of the acquisition apparatus 10 with reference to FIG. 2. FIG. 2 is a diagram for explaining a structure of the acquisition apparatus 10.

One or multiple acquisition apparatuses 10 are connected directly to the change detection apparatus 20, or are connected to the change detection apparatus 20 via a network 500. The acquisition apparatus 10 is composed of a projector 11 serving as a separation detection portion and as a slide data acquisition portion, a microphone 12 serving as a sound pickup portion, and a video camera 13 serving as a capturing portion.

The projector 11 is made of, for example, a liquid crystal projector or the like, and is connected to the change detection apparatus 20. The projector 11 projects slides used in a conference on a screen.

Further, the projector 11 has information for identifying each projector (hereinafter, simply referred to as projector identification information). The projector 11 detects a change of electronic data of projected slides or slides to be projected. Then, the projector 11 transmits a signal indicating that a content is temporally separated (hereinafter, simply referred to as separation signal) in association with the projector identification information to the change detection apparatus 20. Otherwise, it is possible to adopt a structure that a separation time when a separation is detected is transmitted instead of the separation signal.

By way of example, a statement or the like to be recorded as minutes information is made on slide data being displayed. Therefore, in accordance with the structure, a recorded time segment in which a separation is defined based on a slide display change time can be extracted. Therefore, it becomes difficult to create a difference between the extracted recorded time segment and a time segment to be recorded as minutes information actually.

The microphone 12 is composed of, for example, a piezo-electric microphone. The microphone 12 is arranged and taken along respective participants so that sound of the respective participants can be picked up.

Further, the microphone 12 has information for identifying a microphone (hereinafter, simply referred to as microphone identification information). The microphone 12 transmits picked-up sound information and the microphone identification information in association with each other to the change detection apparatus 20.

The video camera 13 is composed of, for example, a CCD camera. The video camera 13 is arranged to be able to capture states of respective participants and a conference.

Further, the video camera 13 has information for identifying a video camera (hereinafter, simply referred to as video camera identification information). The video camera 13 transmits captured information and the camera identification information in association with each other to the change detection apparatus 20.

A description will be continuously given of the structure of the minutes taking system with reference to FIG. 1 again.

The change detection apparatus 20 is composed, for example, a changeover device. The change detection apparatus 20 is connected to the projector 11, the microphone 12, the video camera 13, a calculation section 110, and a control section 140.

The change detection apparatus 20 detects a change of a displayed image for a description object out of multiple displayed images as information displayed in a conference. The displayed image includes information such as slide data projected by the projector 11 in the conference.

A description will be given more specifically of the following case. In this case, slides projected by the projector 11 composing the multiple acquisition apparatuses 10 are captured by each video camera 13. Only a captured image obtained by capturing a slide for a description object out of captured slides is displayed in a specific position of a display screen of the display apparatus 40.

First, a user 400 inputs a command to change a display of the display apparatus 40 to a captured image obtained by capturing a slide for a description object to the input apparatus 50. After that, the command inputted to the input apparatus 50 and camera identification information of a post-change camera are notified to the change detection apparatus 20 through the control section 140.

Next, the change detection apparatus 20 changes from an image captured by a video camera which has captured a slide for a previous description object (hereinafter, simply referred to as pre-change video camera) to an image captured by a video camera which is capturing a slide for a new description object (hereinafter simply referred to as post-change video camera), and transmits the newly captured image to the control section 140.

Therefore, the change detection apparatus 20 detects that the displayed image for a description object is changed by the change of the captured images.

After that, the change detection apparatus 20 transmits camera identification information of the pre-change video camera (hereinafter, simply referred to as pre-change camera identification information), camera identification information of the post-change video camera (hereinafter, simply referred to as post-change camera identification information), and a signal indicating that the change is detected (hereinafter, simply referred to as change signal) in association with each other to the calculation section 110 of the minutes taking apparatus 100. It is possible to adopt a structure that a change time when the change is detected is transmitted instead of the change signal.

The sound reproduction apparatus 30 is composed of, for example, a speaker. The sound reproduction apparatus 30 is connected to the control section 140. The sound reproduction apparatus 30 reproduces sound information or the like received from the control section 140.

The display apparatus 40 is composed of, for example, a liquid crystal display apparatus or a CRT. The display apparatus 40 is connected to the control section 140. The display apparatus 40 displays display information received from the control section 140.

The input apparatus 50 is composed of, for example, a keyboard, a mouse, or a touch panel. The input apparatus 50 is connected to the control section 140. Conference identification information, various commands, minutes information and the like are inputted from a clerk 300 to the input apparatus 50. The input apparatus 50 transmits the inputted conference identification information, the inputted execution commands, the inputted minutes information and the like to the control section 140.

The minutes taking apparatus 100 is composed of, for example, a personal computer or the like. The minutes taking apparatus 100 is composed of the calculation section 110, a minutes taking section 120 serving as a minutes taking portion, an accumulation section 130 serving as an accumulation portion, the control section 140, an extraction section 150 serving as an extraction portion, a delivery minutes taking section 160 serving as a delivery minutes taking portion, a delivery section 170 serving as a delivery portion and the like.

Execution commands and information such as minutes information including a minutes are inputted from the clerk 300 to the minutes taking apparatus 100. The minutes taking apparatus 100 displays display information. The minutes information represents information composing a minutes, and particularly includes a comment as sentences including the minutes.

The minutes taking apparatus 100, not shown, is connected to remote terminals used by participants or the like of a conference and the acquisition apparatus 10 via the network 500. The minutes taking apparatus 100 transmits a delivery minutes to the remote terminals through the network 500. Further, the remote terminals refer to picked-up sound, captured images, or slide data which are linked to the delivery minutes from the minutes taking apparatus 100.

Further, the minutes taking apparatus 100 receives slide data, a separation-signal, projector identification information, pre-change camera identification information, post-change camera identification information, a change signal, a captured image and camera identification information thereof, picked-up sound and microphone identification information thereof and the like from the acquisition apparatus 10 through the network 500.

The calculation section 110, the minutes taking section 120, the accumulation section 130, the control section 140, the extraction section 150, the delivery minutes taking section 160, and the delivery section 170, which will be hereinafter described, are composed of, for example, a CPU, a memory, and a software for controlling the CPU and the memory and the like.

The calculation section 110 is connected to the change detection apparatus 20, the minutes taking section 120, and the control section 140. The calculation section 110 receives slide data, a separation signal, projector identification information, pre-change camera identification information, post-change camera identification information, a change signal, a captured image and camera identification information thereof, picked-up sound and microphone identification information thereof and the like from the change detection apparatus 20.

Further, the calculation section 110 receives a signal indicating that the clerk 300 is inputting minutes information from the control section 140 (hereinafter, simply referred to as input signal) without delay from input by the clerk. Thereby, the calculation section 110 can know a start time and a finish time of the minutes information input by the clerk 300. Thus, the calculation section 110 calculates a time segment of the minutes information input (hereinafter, simply referred to as minutes information input segment).

After that, the calculation section 110 transmits the slide data, the separation signal, the projector identification information, the pre-change camera identification information, the post-change camera identification information, the change signal, the captured image and the camera identification information thereof, and the picked-up sound and the microphone identification information thereof which are received from the change detection apparatus 20, and the calculated minutes information input segment to the minutes taking section 120.

The minutes taking section 120 is connected to the calculation section 110, the accumulation section 130, and the control section 140. The minutes taking section 120 receives the slide data, the separation signal, the projector identification information, the pre-change camera identification information, the post-change camera identification information, the change signal, the captured image and the camera identification information thereof, the picked-up sound and the microphone identification information thereof, the minutes information input segment and the like from the calculation section 110.

Further, the minutes taking section 120 receives the minutes information or the like which the clerk 300 is inputting and a command that instructs to take a minutes or the like from the control section 140. After that, the minutes taking section 120 takes the minutes based on the received minutes information in accordance with the received command. Next, the minutes taking section 120 transmits such taken minutes to the control section 140.

Further, the minutes taking section 120 transmits the slide data, the separation signal, the projector identification information, the pre-change camera identification information, the post-change camera identification information, the change signal, the captured image and the camera identification information thereof, the picked-up sound and the microphone identification information thereof, and the minutes information input segment which are received from the calculation section 110, and the taken minutes to the accumulation section 130.

The accumulation section 130 receives the slide data, the separation signal, the projector identification information, the pre-change camera identification information, the post-change camera identification information, the change signal, the captured image and the camera identification information thereof, the picked-up sound and the microphone identification information thereof, the minutes information input segment and the minutes.

Further, the accumulation section 130 regards a time of receiving the separation signal as a time when the projector detects a separation. Further, the accumulation section 130 regards a time of receiving the change signal as a time when the change detection apparatus 20 detects a change.

The accumulation section 130 accumulates the received slide data, the received separation time, and the received projector identification information in association with each other in a database 180. The time when the separation signal is received is created based on a system time.

To accumulate minutes information and an extracted recorded time segment in association with each other, the extraction section 150 can accumulate the minutes information and at least slide data displayed in the recorded time segment which is extracted at the extraction section 150 in association with each other via time information.

By way of example, in general, in the minutes information, a statement on the slide data for a display object is regarded as a recording object. Therefore, with the above-described configuration, it is possible to know a slide displayed in a time segment to be recorded as the minutes information.

Further, the accumulation section 130 accumulates the captured image, the camera identification information, and the system time in association with each other in the database 180. Thereby, minutes information and a captured image including a recorded time segment extracted at the extraction section 150 can be accumulated in association with each other.

As an example, in general, in the minutes information, a statement is regarded as a recording object. Therefore, with the above-described configuration, it is possible to know a state of a conference when the statement to be recorded as the minutes information is made.

Further, the accumulation section 130 accumulates the picked-up sound and the microphone identification information thereof, and the system time in association with each other in the database 180. Thereby, minutes information and picked-up sound including a recorded time segment extracted at the extraction section 150 can be accumulated in association with each other.

As an example, in general, in the minutes information, a statement is regarded as a recording object. Therefore, with the above-described configuration, it is possible to know a statement to be recorded as the minutes information.

Further, the accumulation section 130 accumulates the minutes information input segment and the minutes in association with each other in the database 180. Finally, the accumulation section 130 accumulates the change time, the pre-change camera identification information, and the post-change camera identification information in association with each other.

The control section 140 is connected to the change detection apparatus 20, the sound reproduction apparatus 30, the display apparatus 40, the input apparatus 50, the calculation section 110, the minutes taking section 120, the extraction section 150, the delivery minutes taking section 160, and the delivery section 170.

The control section 140 receives an image captured by a video camera, which is capturing a slide for a description object from the change detection apparatus 20.

The control section 140 controls the sound reproduction apparatus 30 to output picked-up sound or the like. The control section 140 controls the display apparatus 40 to display a captured image or the like. Further, the control section 140 receives a command, minutes information and the like from the input apparatus 50. Further, the control section 140 transmits display information to control the display apparatus 40 to display the captured image received from the change detection apparatus 20.

The control section 140 receives a comment which the clerk 300 is inputting from the input apparatus 50, and transmits an input signal to the calculation section 110 without delay. The calculation section 110 calculates a minutes information input segment based on the input signal.

After the control section 140 receives a command to instruct extraction, inputted through the input apparatus 50, or after detection is made that a given time elapses, the control section 140 transmits an execution command to the extraction section 150.

Further, the control section 140 transmits minutes information being inputted and a command to add the minutes information to the minutes which are received from the input apparatus 50 to the minutes taking section 120.

Further, the control section 140 transmits a receiving address, a transmitting address, conference bibliography information, minutes information, and minutes information to be delivered, which are referred to from the database 180 to the delivery minutes taking section 160. The delivery minutes information is minutes information including a minutes to which the control apparatus 140 refers from the database 180. The delivery minutes information means minutes information selected by the clerk 300 as minutes information for a delivery object through the input apparatus 50 or the like.

The control section 140 receives a delivery command inputted through the input apparatus 50, and transmits the delivery command to the delivery section 170. Further, the control section 140 refers to accumulated participant names, receiving addresses, transmitting addresses, conference bibliography information, a minutes or the like from the database 180.

The extraction section 150 is connected to the control section 140 and the database 180. After the extraction section 150 receives a command to instruct the extraction inputted at the input apparatus 50 by the user 400 through the control section 140, or after the extraction section 150 detects that a given time elapses, the extraction section 150 tentatively extracts a recorded time segment to be recorded as minutes information based on a minute information input segment which is accumulated in association with minute information including a minutes. The tentatively extracted recorded time segment is called a tentative recorded time segment. It is possible to adopt a structure that the minutes information input segment corresponds to the recorded time segment.

Specifically, the extraction section 150 refers to a change time and a separation time, which are accumulated in the database 180. After that, the extraction section 150 executes processing of creating a virtual stream having virtual slide segments (hereinafter, simply referred to as virtual stream creation processing), based on the referred change time, the referred separation time, and a slide stream.

The slide stream is slide data inputted in the projector 11 to project the slide data of the respective acquisition apparatuses 10. The slide stream means a series of information flow accumulated in the database 180 of the minutes taking apparatus 100 directly or via the network 500. The slide data is one of the information displayed in a conference.

As an example, a statement or the like to be recorded as minutes information is made on a content with a separation of a slide displayed on the screen changeably. Therefore, with the above-described configuration, a recorded time segment in which the separation is defined based on both a change time and a separation time can be extracted. As a result, it becomes difficult to create a difference between the extracted recorded time segment and a time segment to be recorded as minutes information actually.

Further, it is possible to adopt a configuration that each acquisition apparatus 10 has a liquid crystal display, a CRT display apparatus or the like instead of the projector 11. In this case, the slide stream is slide data inputted to be displayed on a liquid crystal display or the like of each acquisition apparatus 10. In this case, the slide stream means a series of information flows accumulated in the database 180 of the minute taking apparatus 100 directly or via the network 500.

As an example, a statement or the like to be recorded as minutes information is made on a content with a separation of a slide changeably displayed on the display screen. Therefore, in accordance with the structure, a recorded time segment in which the separation is defined based on both a change time and a separation time can be extracted. As a result, it becomes difficult to create a difference between the extracted recorded time segment and a time segment to be recorded as minutes information actually.

The virtual slide segment is a segment obtained by further separating a slide segment by a change time, the slide segment being separated based on a separation time separating a content of a slide stream. The virtual slide segment also has a time segment from a start time to a finish time of a conference.

After that, the change time is complemented by executing complementary processing by using an average value based on the referred change time and the referred separation time (hereinafter, simply referred to as average value complementary processing). The change time that is complemented is referred to as complemented change time. For the average value complementary processing, a description will be described later.

Otherwise, the extraction section 150 complements the change time by executing complementary processing with the use of a deviation rate based on the referred separation time (hereinafter, simply referred to as deviation rate complementary processing). Similarly, the change time which is complemented is referred to as complemented change time. Also, a description will be given later of the deviation rate complementary processing.

Next, the extraction section 150 corrects the virtual slide segment based on the complemented change time, and extracts a recorded time segment based on the corrected virtual slide segment and the already extracted tentative recorded time segment. After that, the extraction section 150 accumulates the extracted recording time segment, the minutes information composing the minutes, and the recorded time segment in association with each other in the database 180.

Therefore, the minutes information, the recorded time segment, the slide data displayed in the recorded time segment, the picked-up sound which is picked up in the recorded time segment, and the captured image which is captured in the recorded time segment which are accumulated in the database 180 are associated with each other based on the time information.

Figure 3:
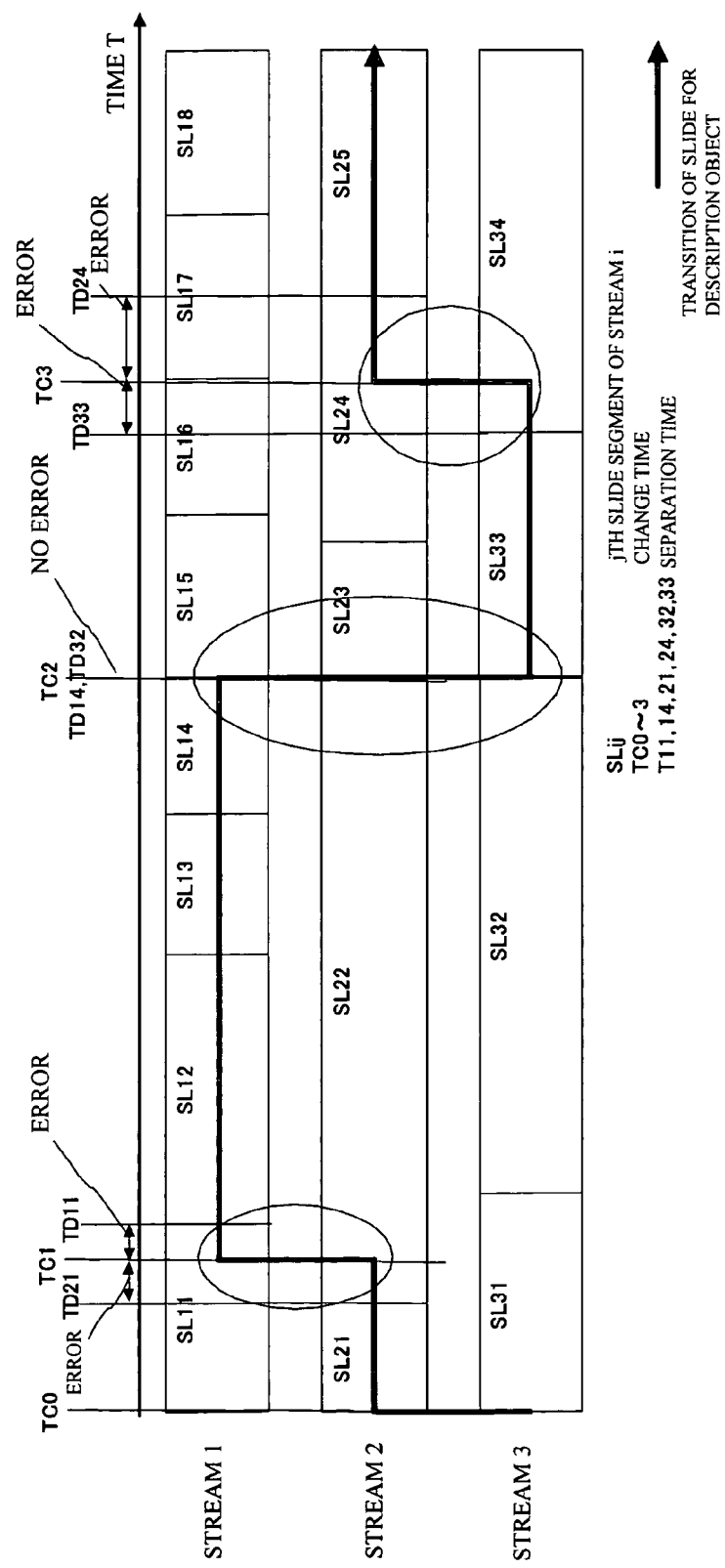
FIG. 3 is a diagram explaining necessity of complementing a change time.

Before a description is given of a complementary method of a change time, first, a description will be given of necessity of complement with reference to FIG. 3. FIG. 3 is a diagram explaining the necessity of complementing a change time.

Generally, a statement or the like to be recorded as minutes is made on a slide for a description object. Therefore, it is a rare case where a statement to be recorded goes over time TC0 and time TC3, which are times when a description object is changed.

Further, in general, a statement or the like is made on a content of a slide for a description object. Therefore, it is a rare case where a statement goes over times TD11, TD 14, TD21, TD24, TD32, and TD33, which are times when a display slide is changed and a displayed content is temporarily separated.

Therefore, by extracting a time segment in which a statement or the like is made based on a time segment separated by the change time TC and the separation time TD (that is, recorded time segment), it becomes difficult to create a difference between a time segment in which the statement is actually made and the extracted time segment.

Ideally, it is desirable that the change time TC corresponds to the separation time TD as a relation between TC2 and TD14/TD32. However, in a case where the change time TC does not correspond to the separation time TD, in a case where an operator who operates a projector or the like and directs a separation of a content by display change of slides is a person different from an operator who directs a change of a slide stream for a description object, or in a case where multiple slide streams are received via a network, a delay occurs, for example, as a relation between TC1 and TD11/TD21 or a relation between TC3 and TD33/TD24.

Therefore, when a time segment is separated simply based on the change time TC and the separation time TD, a very little segment caused by an error has an effect thereon. Therefore, it is necessary to extract a recorded time segment which is separated by a change time obtained by complementing the change time TC based on the separation time TD, or obtained by complementing the change time TC based on the separation time TD and the change time TC.

Figure 4:
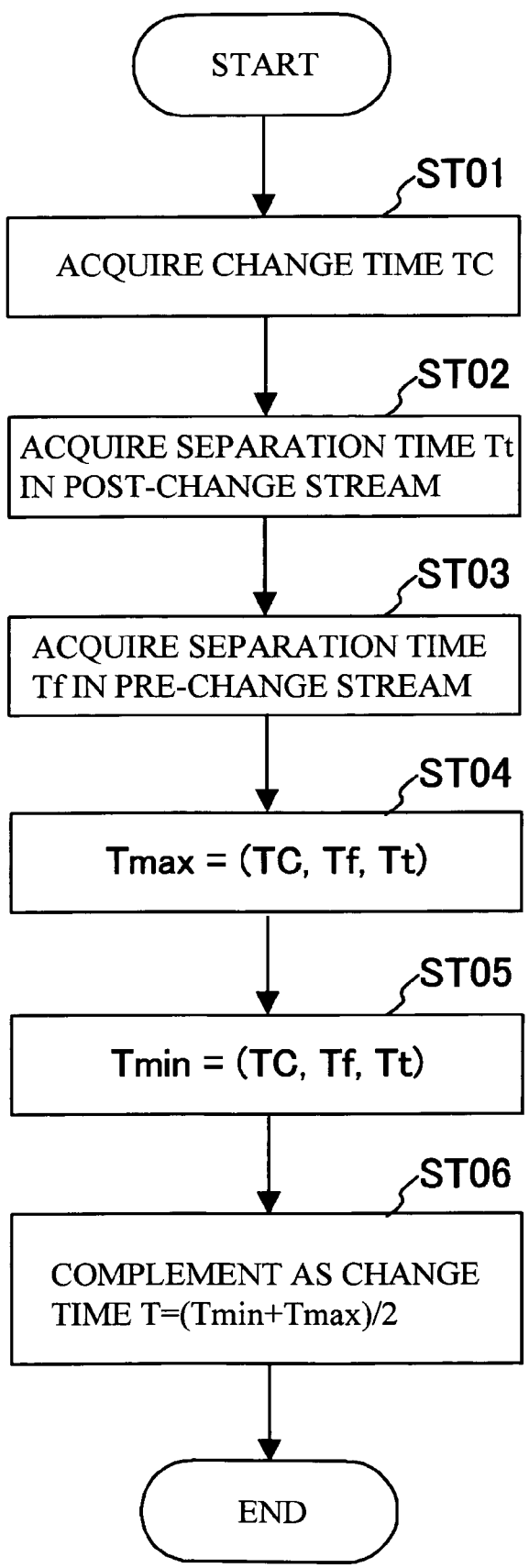
FIG. 4 is a flowchart showing average complementary processing executed by an extraction section.

Next, a description will be given of the average complementary processing executed by the extraction section 150 with reference to FIG. 4. FIG. 4 is a flowchart showing the average complementary processing executed by the extraction section 150.

First, the extraction section 150 acquires the change time TC for a processing object (step ST1). Next, the extraction section 150 acquires separation time Tt in a post-change slide stream for a description object (hereinafter, simply referred to as post-change stream). Tt represents a time closest to the change time T out of separation times of the post-change stream (step ST2).

Next, the extraction section 150 acquires separation time Tf in a pre-change slide stream for a description object (hereinafter, simply referred to as pre-change stream). Tf represents a time closest to the change time T out of separation times of the pre-change stream (step ST3).

After that, the extraction section 150 acquires the latest time Tmax out of the separation times Tf, Tt and the change time TC (step ST4).

Next, the extraction section 150 acquires the earliest time Tmin out of the separation times Tf, Tt and the change time TC (Step ST5).

After that, the extraction section 150 calculates a complemented change time T as a complemented time of the change time TC as an average value of Tmax and Tmin (step ST6). After that, the extraction section 150 ends the processing.

As an example, it is a rare case where a statement is made in a time segment in which the change time and the separation time are approximate to each other. Further, with the configuration, a recorded time segment can be extracted based on a complemented change time. Therefore, as an example, as compared to an apparatus in which a recorded time segment is extracted based on an uncomplemented change time and a separation time, there is no possibility of extracting a segment in which a statement or the like is rarely made. Thus, it becomes difficult to create a difference between an extracted recorded time segment and a time segment to be recorded as a minutes actually.

Figure 5:
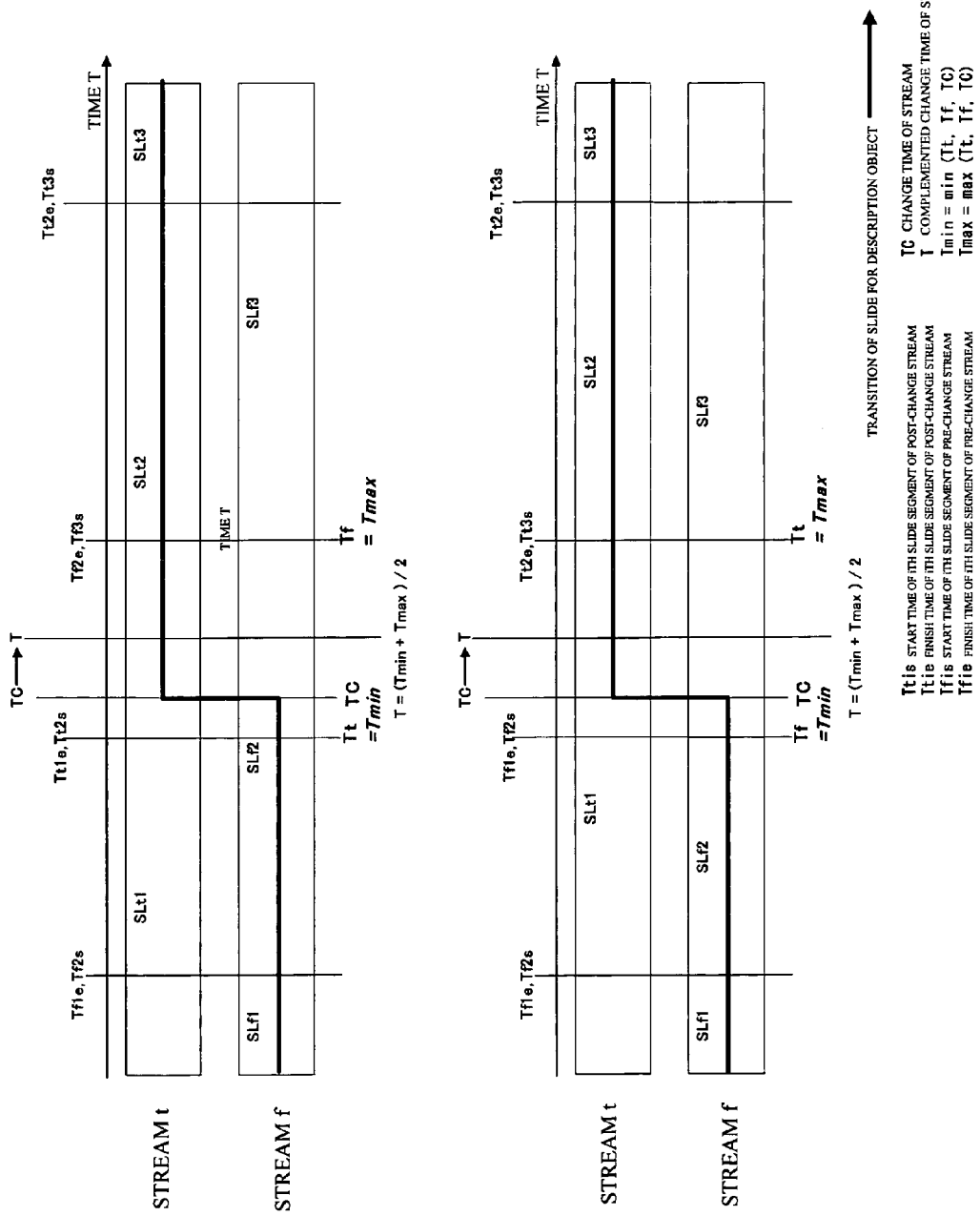
FIG. 5 is an example for explaining a relation between a complemented change time and a change time/a separation time.

Next, a description will be given of a relation between a complemented change time and a change time/a separation time with reference to FIGS. 5 to 7. FIG. 5 is an illustrative diagram for explaining a relation between a complemented change time and the change time T or a separation time.

In the upper diagram and the lower diagram of FIG. 5, a description will be given of a case where a change of a stream occurs between the separation time Tt of a post-change stream and the separation time Tf of a pre-change stream. In this case, the change time TC is corrected as an intermediate time T between Tt and Tf.

Figure 6:
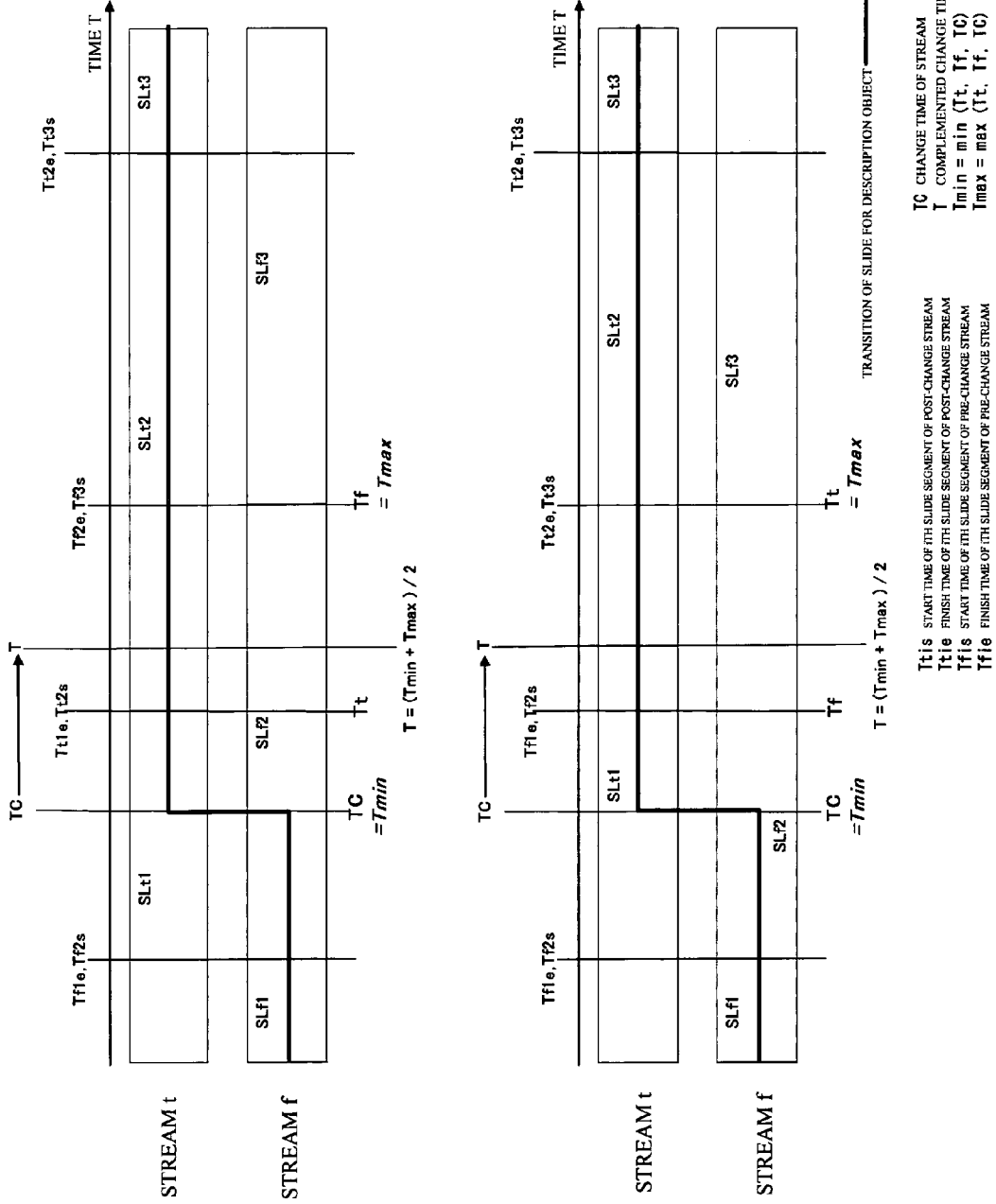
FIG. 6 is another example for explaining a relation between a complemented change time and a change time/a separation time.

FIG. 6 is an other example for explaining a relation between a complemented change time and the change time T or a separation time.

In the upper diagram and the lower diagram of FIG. 6, a description will be given of a case where a change of a stream occurs before both the separation time Tt of a post-change stream and the separation time Tf of a pre-change stream. When Tf is later than Tt, the change time TC is corrected as the intermediate time T between the change time TC and Tf. Otherwise, the change time TC is corrected as the intermediate time T between the change times TC and Tt.

Figure 7:
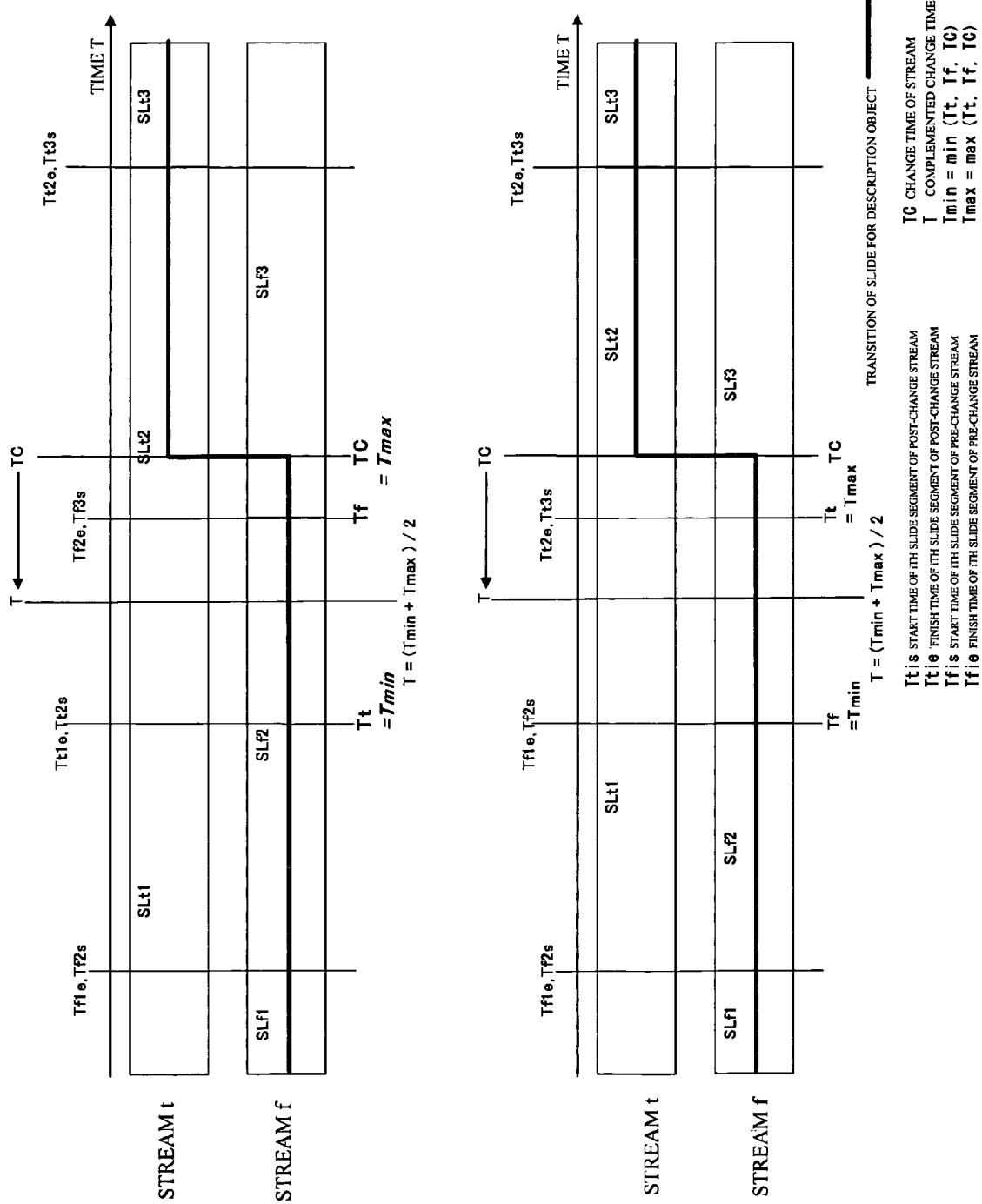
FIG. 7 is still another example for explaining a relation between a complemented change time and a change time/a separation time.

FIG. 7 is still another example for explaining a relation between a complemented change time and the change time T/a separation time.

In the upper diagram and the lower diagram of FIG. 7, a description will be given of a case where a change of a stream occurs after both the separation time Tt of a post-change stream and the separation time Tf of a pre-change stream. When Tf is earlier than Tt, the change time TC is corrected to the intermediate time T between the change time TC and Tf. Otherwise, the change time TC is corrected to the intermediate time T between the change times TC and Tt.

Figure 8:
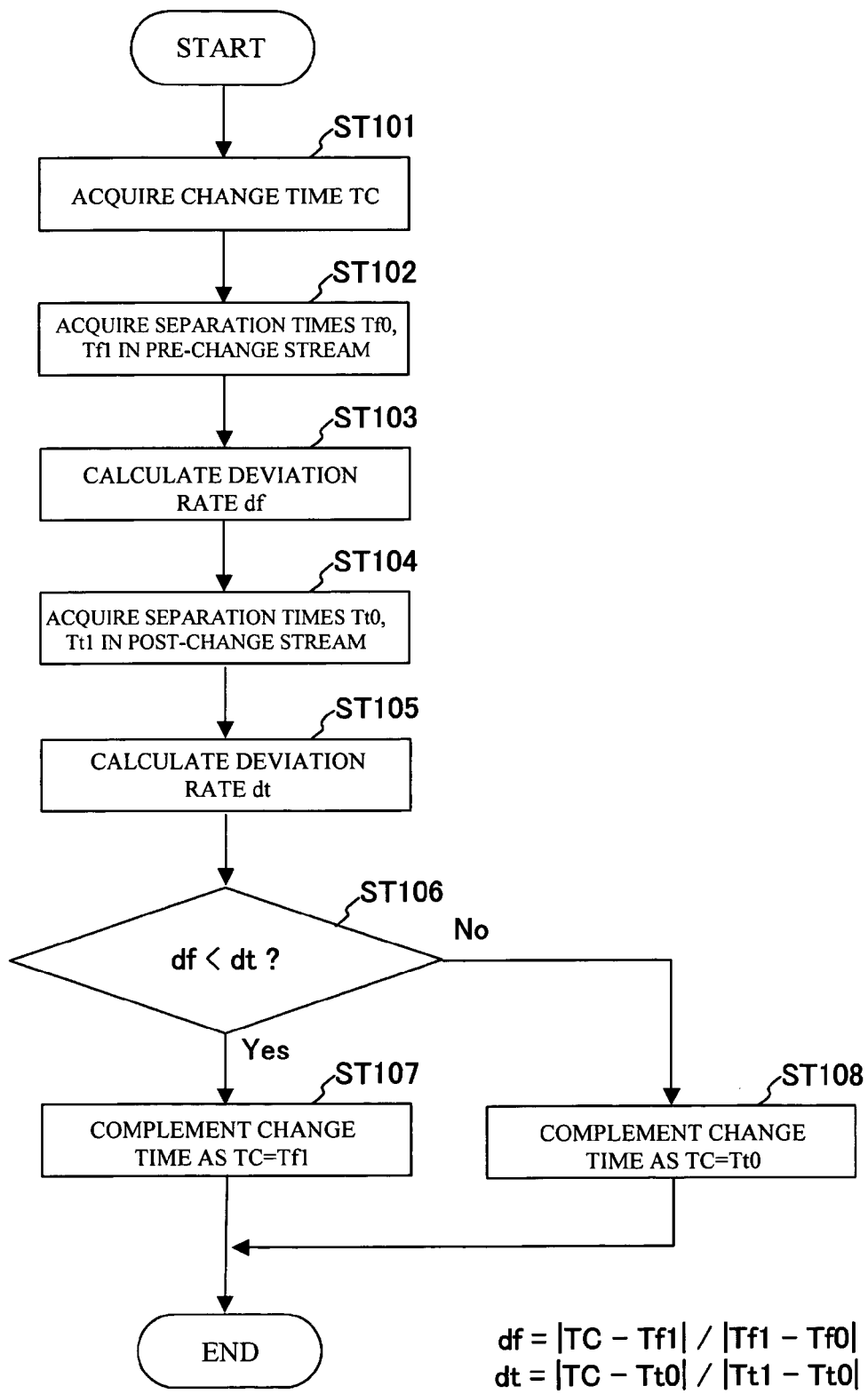
FIG. 8 is a flowchart showing a deviation rate complementary processing executed by the extraction section.

Next, a description will be given of the deviation rate complementary processing executed by the extraction section 150 with reference to FIG. 8. FIG. 8 is a flowchart showing the deviation rate complementary processing executed by the extraction section 150.

First, the extraction section 150 acquires the change time TC for a processing object (step ST101). Next, the extraction section 150 acquires separation times Tf0 and Tf1 in a pre-change stream. Tf1 represents a time closest to the change time T out of separation times of the pre-change stream. Tf0 represents a separation time of the pre-change stream which is closest to Tf1 and is earlier than Tf1 (step ST102).

Next, the extraction section 150 calculates deviation rate df based on the separation times Tf1 and Tf0 which are acquired in step ST102 and the change time TC (step ST103). Specifically, a value obtained by dividing a difference between the change time TC and the separation time Tf1 by a difference between the separation time Tf1 and the separation time Tf0 is found. An absolute value of such obtained value is calculated as the deviation rate df.

Subsequently, the extraction section 150 acquires the separation times Tt0 and Tt1 in a post-change stream. Tt0 represents a time closest to the change time T out of separation times of the post-change stream. Tt1 represents a separation time of the post-change stream which is closest to Tt0 and is later than Tt0 (step ST104).

Next, the extraction section 150 calculates deviation rate dt based on the separation times Tt1 and Tt0 which are acquired in step ST104 and the change time TC (step ST105). Specifically, a value obtained by dividing a difference between the change time TC and the separation time Tt0 by a difference between the separation time Tt1 and the separation time Tt0 is found. An absolute value of such obtained value is calculated as the deviation rate dt.

Subsequently, the extraction section 150 judges whether or not the deviation rate df calculated in step ST203 is smaller than dt calculated in step ST105 (step ST106). When it is determined that the deviation rate df is smaller than dt, the extraction section 150 executes processing of step ST107. Otherwise, the extraction section 150 executes processing of step ST108.

When the extraction section 150 determines that the deviation rate df is smaller than dt in step ST106, the extraction section 150 complements the change time TC as Tf1 (step ST107). After that, the extraction section 150 ends execution of the processing.

When the extraction section 150 determines that the deviation rate df is equal to or more than dt in step ST106, the extraction section 150 complements the change time TC as Tt0 (step ST108). Then, the extraction section 150 ends execution of the processing.

As an example, it is a rare case where a statement is made in a time segment in which the change time and the separation time are approximate to each other. Further, with the configuration, a recorded time segment can be extracted based on a complemented change time. Therefore, as an example, as compared to an apparatus in which a recorded time segment is extracted based on an uncomplemented change time and a separation time, there is no possibility of extracting a segment in which a statement or the like is rarely made. Thus, it becomes difficult to create a difference between an extracted recorded time segment and a time segment to be recorded as a minutes actually.

Figure 9:
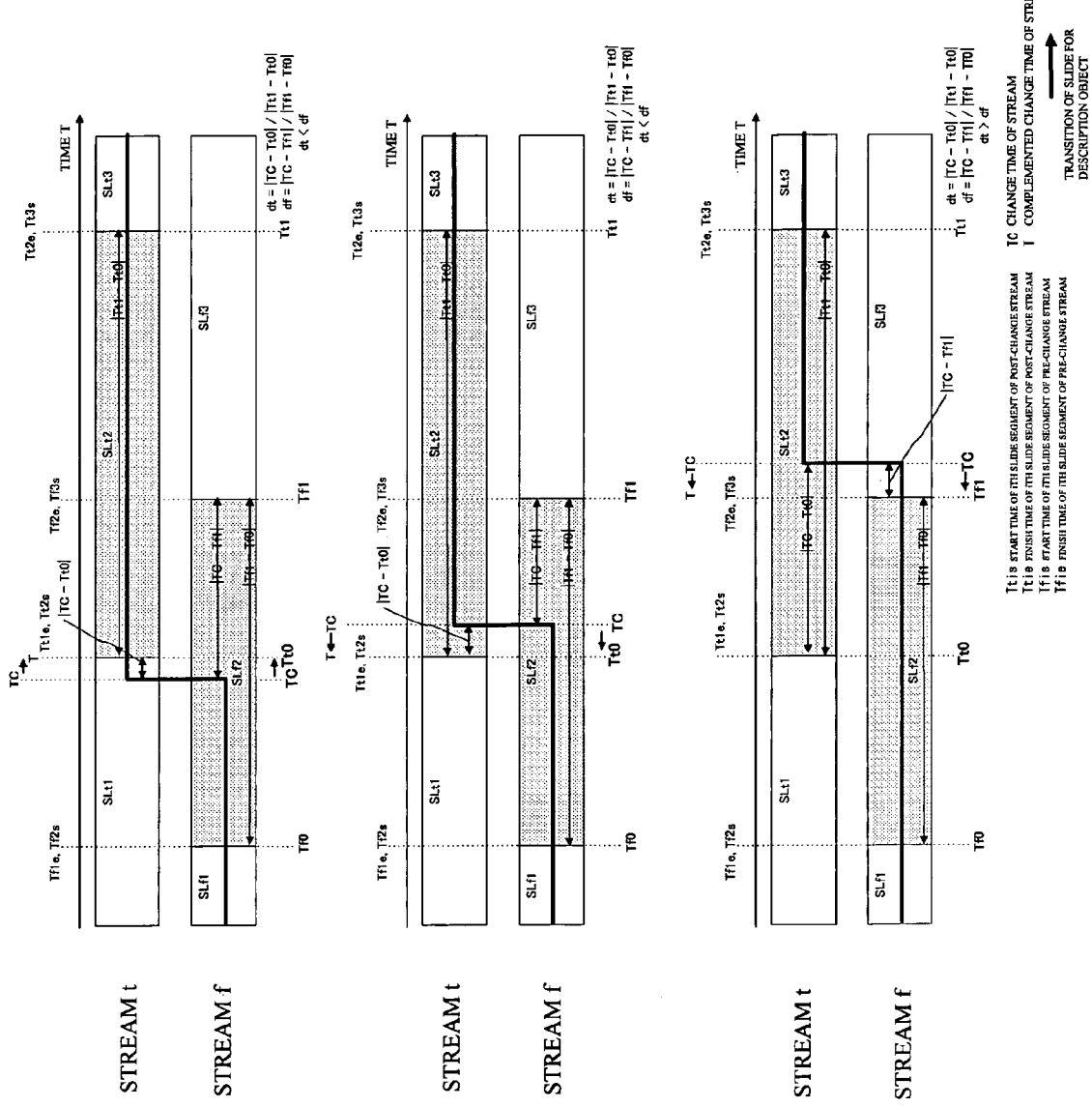
FIG. 9 is a diagram for explaining a relation between a complemented change time and a separation time.

Next, a description will be given of a relation between a complemented change time and a separation time with reference to FIGS. 9 and 10. FIG. 9 is a diagram for explaining a relation between a complemented change time and a separation time.

The upper diagram, the middle diagram, and the lower diagram of FIG. 9 show a case where a segment defined by the separation times Tt0 and Tt1 of a post-change stream is overlaid on a segment defined by the separation times Tf0 and Tf1 of a pre-change stream. Sequentially from the upper diagram, these diagrams respectively show a relation between the complemented change time T and the separation time Tt0/Tt1/Tf0/Tf1 in the case where the change time is before Tt0, in the case where the change time is between Tt0 and Tf1, and in the case where the change time is after Tf1.

In any of the upper diagram, the middle diagram, and the lower diagram, whether the complemented change time T becomes Tt0 or Tf1 depends on the deviation rates dt and df. In the upper and middle diagrams of FIG. 9, the deviation rate dt is smaller than df, and thus the complemented change time T becomes Tt0. Meanwhile, in the lower diagram of FIG. 9, the deviation rate dt is larger than df, and thus the complemented change time T is complemented as Tf1.

Figure 10:
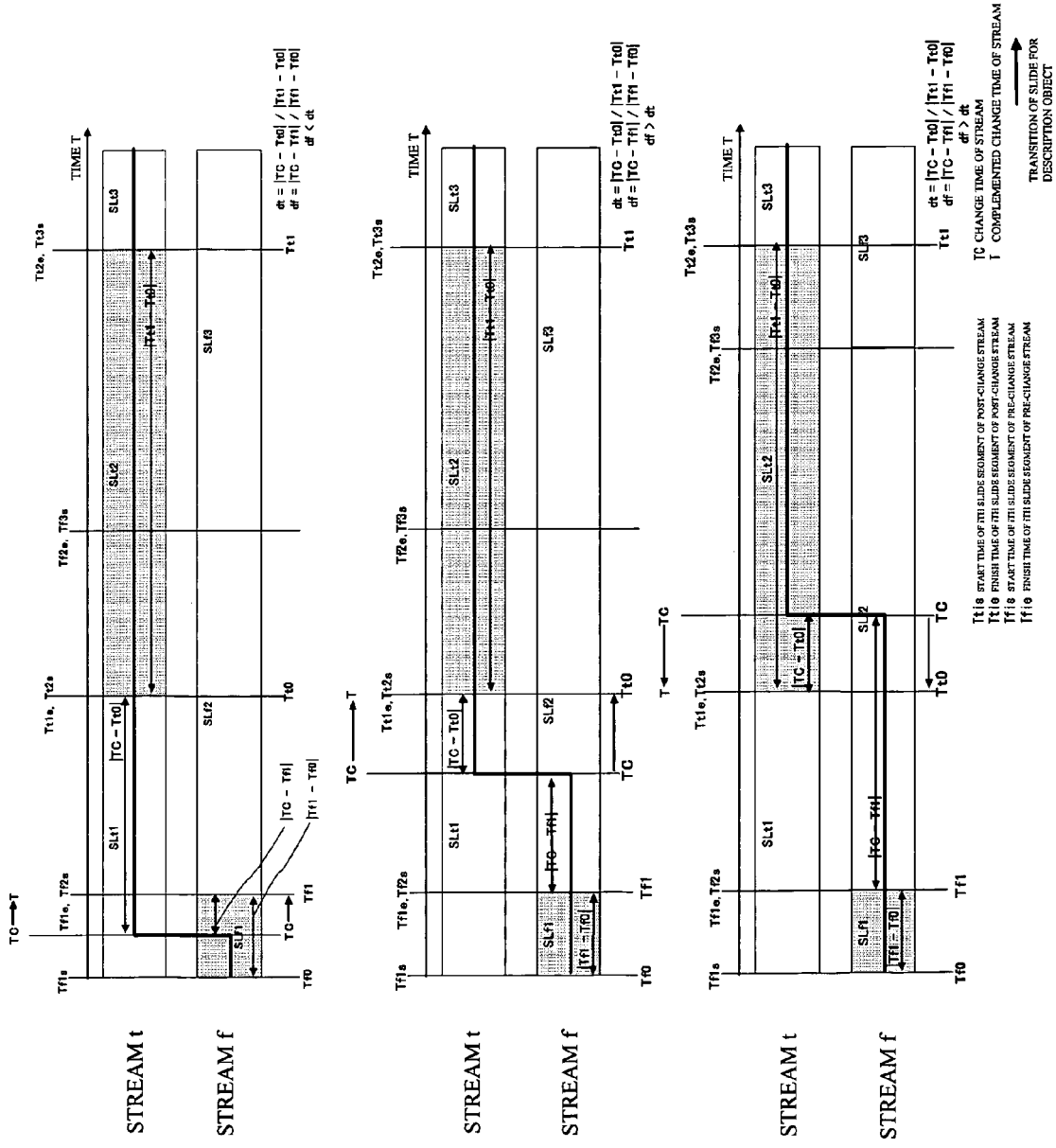
FIG. 10 is a diagram for explaining another relation between a complemented change time and a separation time.

FIG. 10 is a diagram for explaining another relation between a complemented change time and a separation time. The upper diagram, the middle diagram, and the lower diagram of FIG. 10 show a case where a segment defined by the separation times Tt0 and Tt1 of a post-change stream is not overlaid on a segment defined by the separation times Tf0 and Tf1 of a pre-change stream. Sequentially from the upper diagram, these diagrams respectively show a relation between the complemented change time T and the separation time Tt0/Tt1/Tf0/Tf1 in the case where the change time is before Tt0, in the case where the change time is between Tt0 and Tf1, and in the case where the change time is after Tf1.

In any of the upper diagram, the middle diagram, and the lower diagram, whether the complemented change time T becomes Tt0 or Tf1 depends on the deviation rates dt and df. In the upper diagram and the middle diagram of FIG. 10, the deviation rate dt is smaller than df, and thus the complemented change time T becomes Tt0. Meanwhile, in the lower diagram thereof, the deviation rate dt is larger than df, and thus the complemented change time T is complemented as Tf1.

Figure 11:
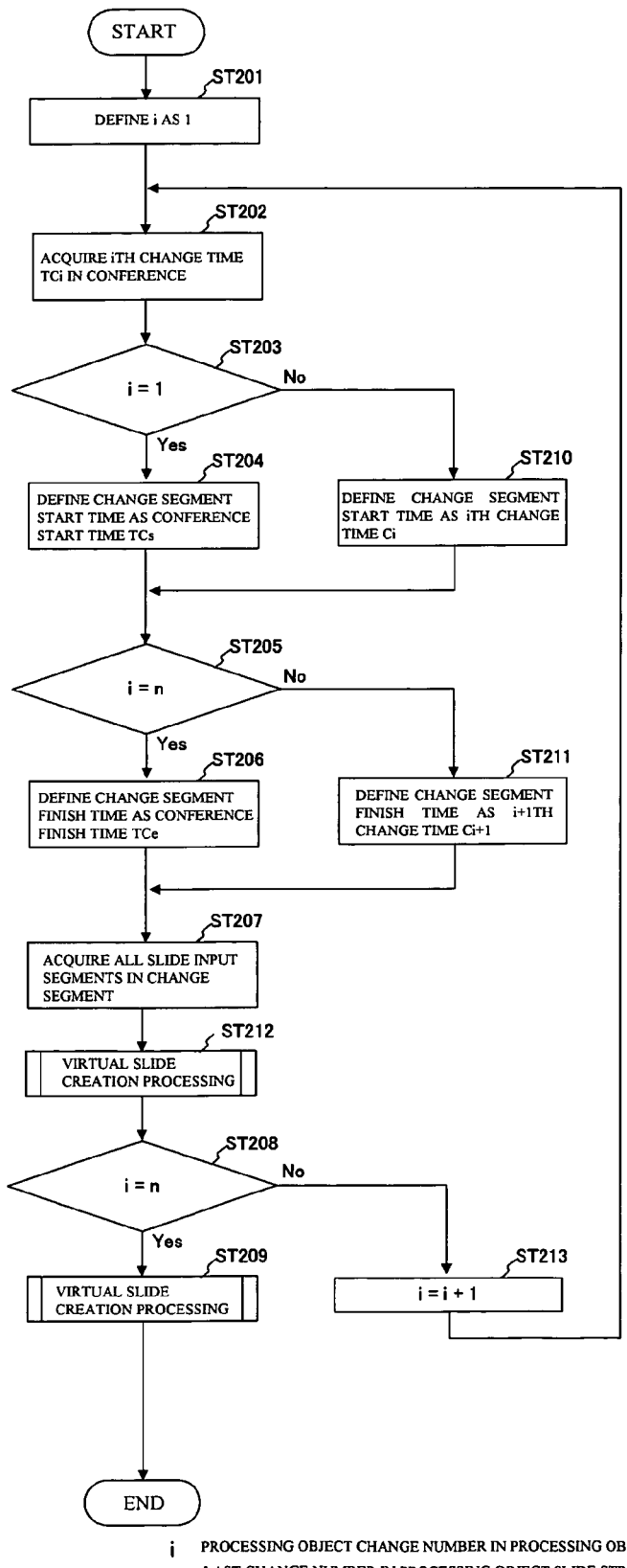
FIG. 11 is a flowchart showing virtual slide creation control processing.

Next, a description will be given of virtual slide creation processing executed by the extraction section 150 with reference to FIGS. 11 to 15. FIG. 11 is a flowchart showing processing for controlling the virtual slide creation processing (hereinafter simply referred to as virtual slide creation control processing). The virtual slide creation control processing is executed for all the slide streams inputted to the minutes taking apparatus 100 sequentially.

First, the extraction section 150 defines temporary variable i representing a change number in a stream for a processing object as 1 (step ST201). Next, the extraction section 150 acquires i-th change time TCi in a conference of the stream for a processing object (step ST202).

Then, the extraction section 150 determines whether or not i is 1. That is, the extraction section 150 determines whether or not TCi is the first change of the stream for a processing object (step ST203). When it is determined that i is 1, the extraction section 150 executes processing of step ST204. Otherwise, the extraction section 150 executes processing of ST210.

When it is determined that i is 1 in step ST203, the extraction section 150 defines a start time of a change segment as conference start time TCs (step ST204). The change segment is a time segment for a virtual slide creation processing object described in step ST212. The change segment means a segment separated by change times (TCi, Tci+1) (or a start time TCs or a finish time TCe of the conference) of the stream for a processing object adopted in step ST204, 206, 210, or 211 (or a segment separated by (TCs, TC1) or (TCn, TCe)).

Figure 12:
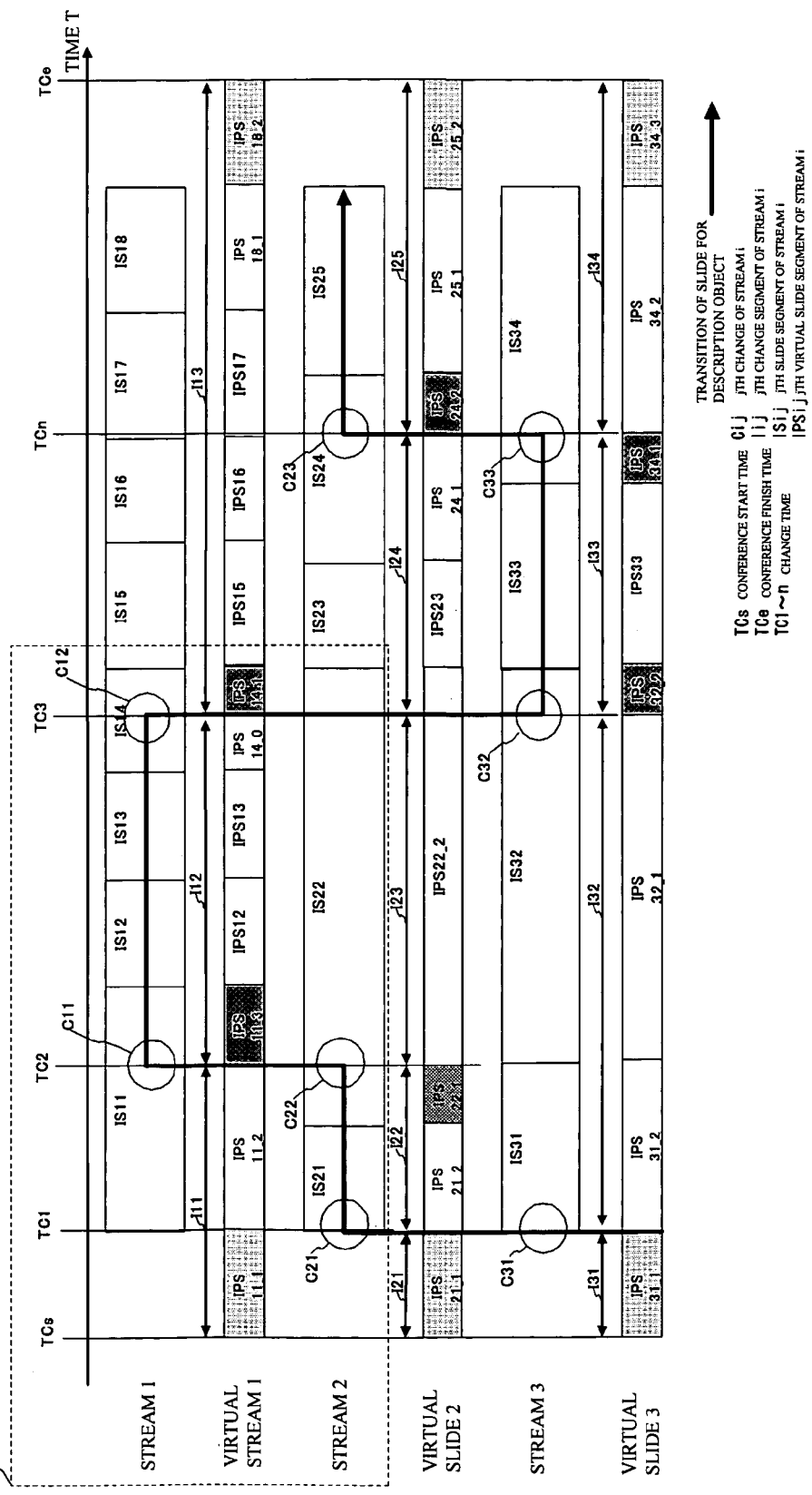
FIG. 12 is a diagram for explaining a concept of the virtual slide creation processing.

A description will be hereinafter given of change of the change segment start time described in step ST204 of the virtual slide creation control processing of FIG. 11. FIG. 12 is a diagram for explaining a concept of the virtual slide creation processing.

FIG. 12 shows a case where a conference using three slide streams starts at the time TCs. After that, the first description object change is made for streams 2 and 3 at a time TC1. Then, the first description object change is made for stream 1 and the second description object change is made for the stream 2 at a time TC2.

Recording statements and a minutes in a conference starts at the conference start time TCs. However, in general, the slide projection start time TC1 is later than the conference start time TCs. Therefore, a period of time between the conference start time and a time when a change of a stream for a description object is made is considered as one separation.

Specifically, as shown in FIG. 12, for the respective slide streams 1 to 3, segments called I11, I21, I31 are defined. For the defined segments, the virtual slide creation processing is executed. With this configuration, it becomes difficult to create a difference between an extracted recorded time segment and a time segment to be recorded as minutes actually.

Next, a description will be continuously given of the virtual slide creation control processing with reference to FIG. 11 again.

After the extraction section 150 executes step ST204 or step ST210, the extraction section 150 determines whether or not i is n. That is, the extraction section 150 determines whether or not the change number of the stream for a processing object, i is the last change number n (step ST205). When it is determined that i is n, the extraction section 150 executes processing of step ST206. Otherwise, the extraction section 150 executes processing of ST211.

When it is determined that i is n in step ST205, the extraction section 150 defines the finish time of the change segment as the conference finish time TCe (step ST206).

After the extraction section 150 executes step ST206 or step ST211, the extraction section 150 acquires all slide time segments inputted to the slide stream in the segment obtained in the above-described step ST204, 206, 210, or 211 (hereinafter, simply referred to as slide segment).

Subsequently, the extraction section 150 executes the virtual slide creation processing (step ST212). The virtual slide creation processing will be described later.

Next, in a similar manner as in step ST205, the extraction section 150 determines whether or not i is n. That is, the extraction section 150 determines whether or not the change number of the stream for a processing object, i is the last change number n (step ST208). When it is determined that i is n, the extraction section 150 executes processing of step ST209. Otherwise, the extraction section 150 executes processing of ST213.

When it is determined that i is n in step ST208, the extraction section 150 executes input change complementary processing (step ST209). After that, the extraction section 150 ends execution of the processing. The input change complementary processing will be described later.

When it is determined that i is not 1 in step ST203, the extraction section 150 defines the finish time of the change segment as the conference finish time TCi (step ST210). Then, the extraction section 150 executes processing of step ST205.

With reference to FIG. 12 again, a description will be hereinafter given of the change of the change segment finish time described in step ST210 of the virtual slide creation control processing of FIG. 11.

FIG. 12 shows a case where after a conference using three slide streams ends slide projection, the conference ends at the time TCe.

Recording statements and a minutes in a conference continues until the conference finish time TCe. However, projecting slides may end before the conference finish time TCe. Therefore, a period of time between the last change of slides and the conference finish time TCe is considered as one separation.

Specifically, as shown in FIG. 12, for the respective slide streams 1 to 3, segments called I13, I25, I34 are defined. For the defined segments, the virtual slide creation processing is executed. With the configuration, it becomes difficult to create a difference between an extracted recorded time segment and a time segment to be recorded as minutes actually.

Next, a description will be continuously given of the virtual slide creation control processing with reference to FIG. 11 again.

When it is determined that i is not n in step ST205, the extraction section 150 defines the finish time of the change segment as (i+1)-th change time Ci+1 (step ST211). After that, the extraction section 150 executes processing of step ST207.

When it is determined that i is not n in step ST208, the extraction section 150 increases the change number for a processing object, i by 1 (step ST213). After that, the extraction section 150 returns to step ST202 to repeat the above-described processing.

Figure 13:
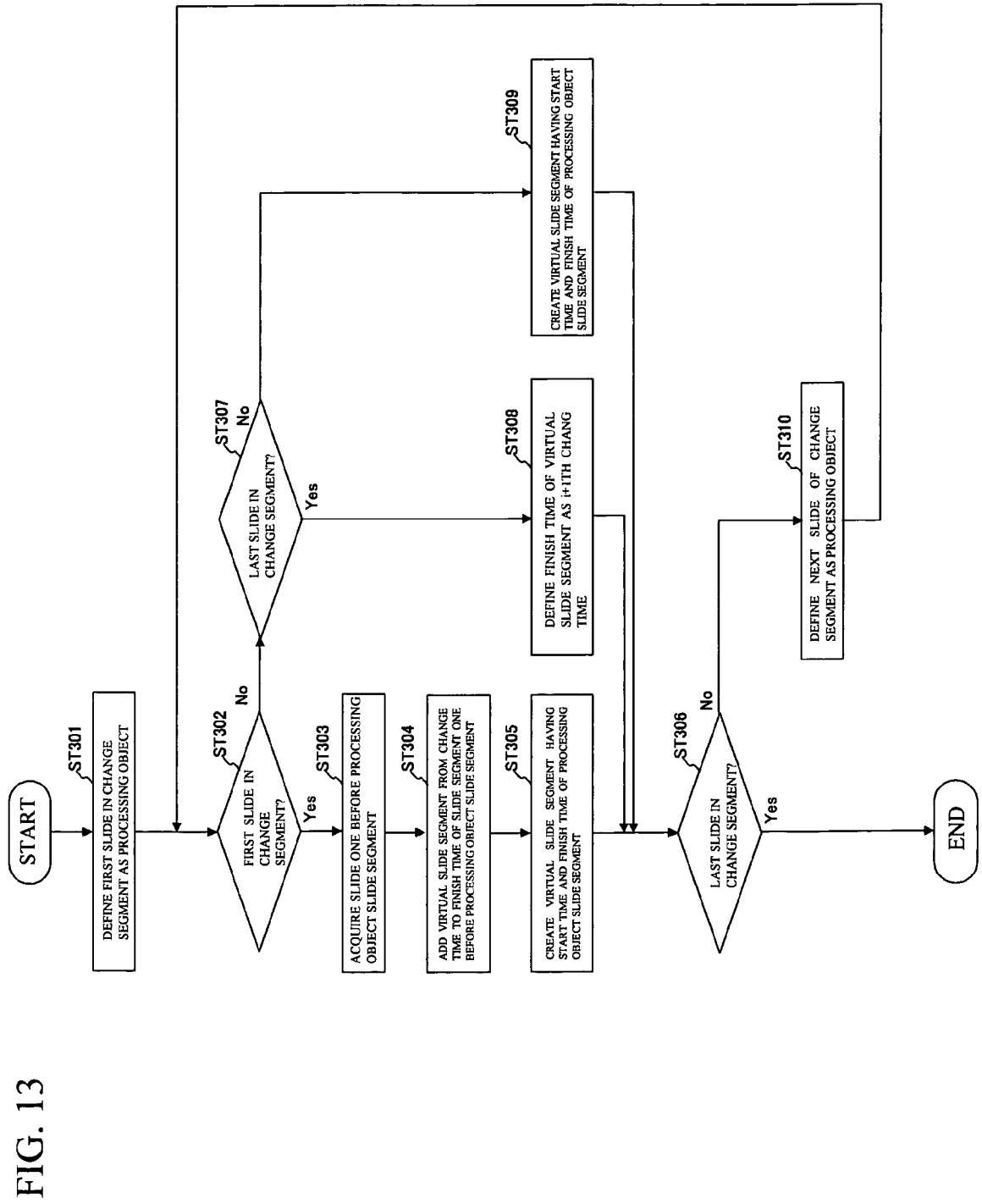
FIG. 13 is a flowchart showing the virtual slide creation processing executed by an extraction section 150.

A description will be given of the virtual slide creation processing executed by the extraction section 150, which is described in step ST212 of FIG. 11 with reference to FIG. 13. FIG. 13 is a flowchart showing the virtual slide creation processing executed by the extraction section 150.

First, the extraction section 150 defines the first slide segment in the change segment as a processing object (step ST301). Such a slide segment for a processing object will be hereinafter simply referred to as processing object slide segment.

Next, the extraction section 150 determines whether or not the processing object slide segment is the first slide segment of the change segment (step ST302). When it is determined that the processing object slide is the first slide segment of the change segment, the extraction section 150 executes step ST303. Otherwise, the extraction section 150 executes processing of ST307.

When it is determined that the processing object slide is the first slide segment of the change segment in step ST302, the extraction section 150 acquires a slide segment, which is one before the processing object slide segment (step ST303). When the slide segment that is one before the processing object slide segment does not exist, the extraction section 150 acquires a segment from the conference start time TCs to a start time of the processing object slide segment as a slide segment.

Next, the extraction section 150 adds a virtual slide segment from the change time to a finish time of the slide that is one before the processing object slide segment acquired in ST303 (step ST304).

Subsequently, the extraction section 150 creates a virtual slide segment having the start time and the finish time of the processing object slide segment (stop ST305).

After executing step ST305, step ST308, or step ST309, the extraction section 150 determines whether or not the processing object slide segment is the last slide segment of the change segment (step ST306). When it is determined that the processing object slide segment is the last slide segment of the change segment, the extraction section 150 ends the virtual slide segment creation processing. Otherwise, the extraction section 150 executes processing of step ST310.

When it is determined that the processing object slide segment is not the first slide segment of the change segment in step ST302, the extraction section 150 determines whether or not the processing object slide segment is the last slide segment of the change segment (step ST307). When it is determined that the processing object slide is the last slide segment of the change segment, the extraction section 150 executes processing of step ST308. Otherwise, the extraction section 150 executes processing of step ST309.

When it is determined that the processing object slide segment is the last slide segment of the change segment in step ST307, the extraction section 150 creates a virtual slide segment in which a finish time of the virtual slide segment is defined as the next (i+1)-th change time. After that, the extraction section 150 executes processing of step ST306.

When it is determined that the processing object slide is not the last slide segment of the change segment in step ST307, the extraction section 150 creates a virtual slide segment having the start time and the finish time of the processing object slide (step ST309). After that, the extraction section 150 executes the processing of step ST306.

When it is determined that the processing object slide is not the last slide segment of the change segment in step ST306, the extraction section 150 defines the next slide segment of the processing object slide segment of the change time as a processing object slide segment (step ST310). After that, the extraction section 150 returns to step ST302 to repeat the above-described processing.

Figure 14:
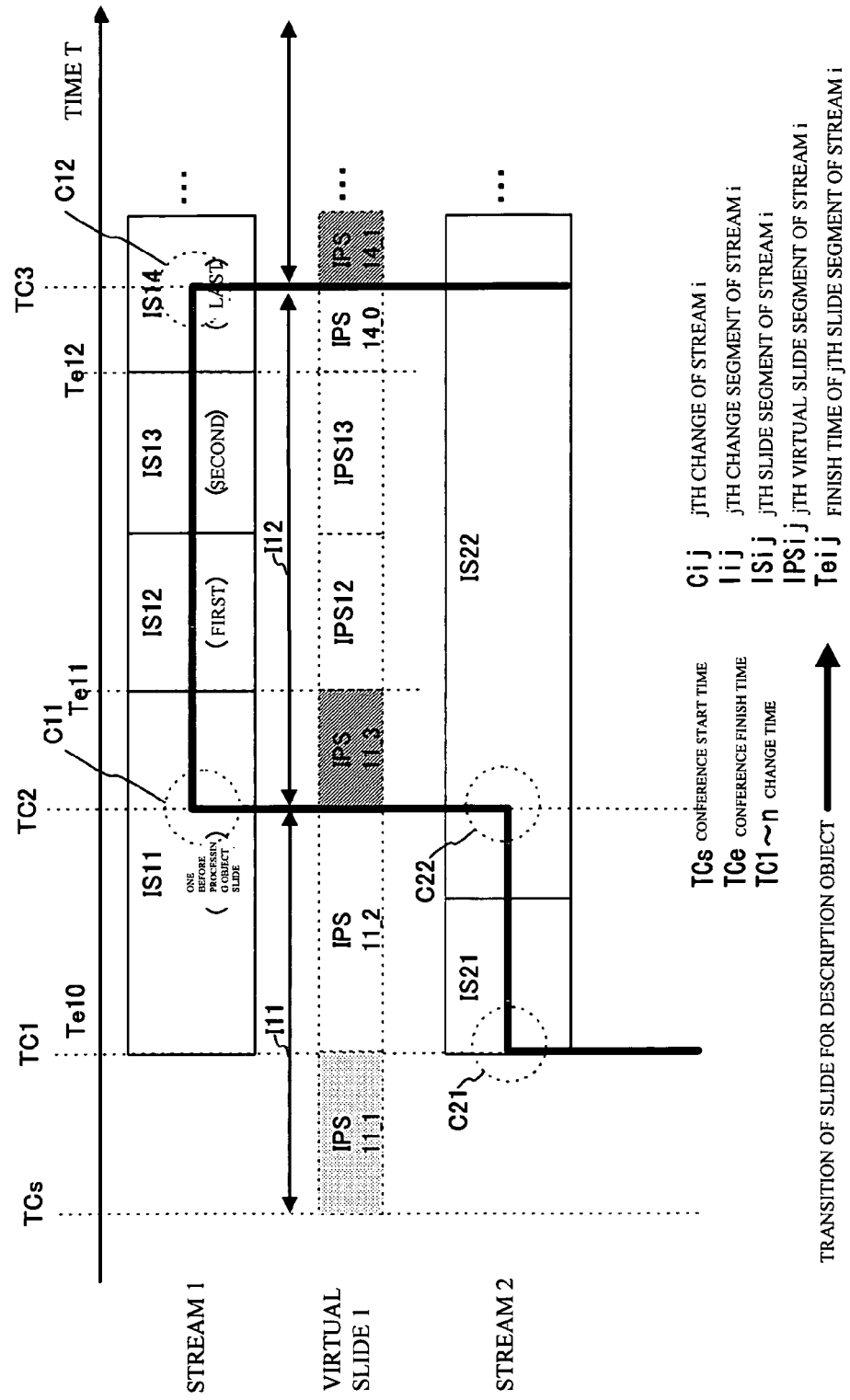
FIG. 14 is a partial enlarged diagram explaining change segment 112 shown in FIG. 13.

With reference to FIG. 14, a description will be hereinafter given again of the virtual slide creation processing described in FIG. 13. FIG. 14 is a partial enlarged diagram representing the change segment 112 shown in FIG. 12.

For example, when the virtual slide creation processing is executed for the change segment 112 shown in FIG. 12, the processing is executed in the order of IS12, IS13, and IS14.

When the first slide IS12 is a processing object slide, the extraction section 150 acquires IS11 as a slide that is one before the processing object slide (step ST303).

Then, the extraction section 150 adds a virtual slide segment IPS11_3 from a change time C11 to a finish time Te11 of the slide Is11, which is one before the processing object slide acquired in ST303 (step ST304).

When the slide that is one before the processing object slide acquired in ST303 does not exist, the extraction section 150 adds virtual slide segment IPS11_1 from the conference start time TCs to a finish time Te10 (step ST303).

When the processing object slide is the last slide IS14 of the change segment, the extraction section 150 adds virtual slide segment IPS14_0 which starts at a segment start time Te12 of the processing object slide and ends at the second change time (step ST309).

Figure 15:
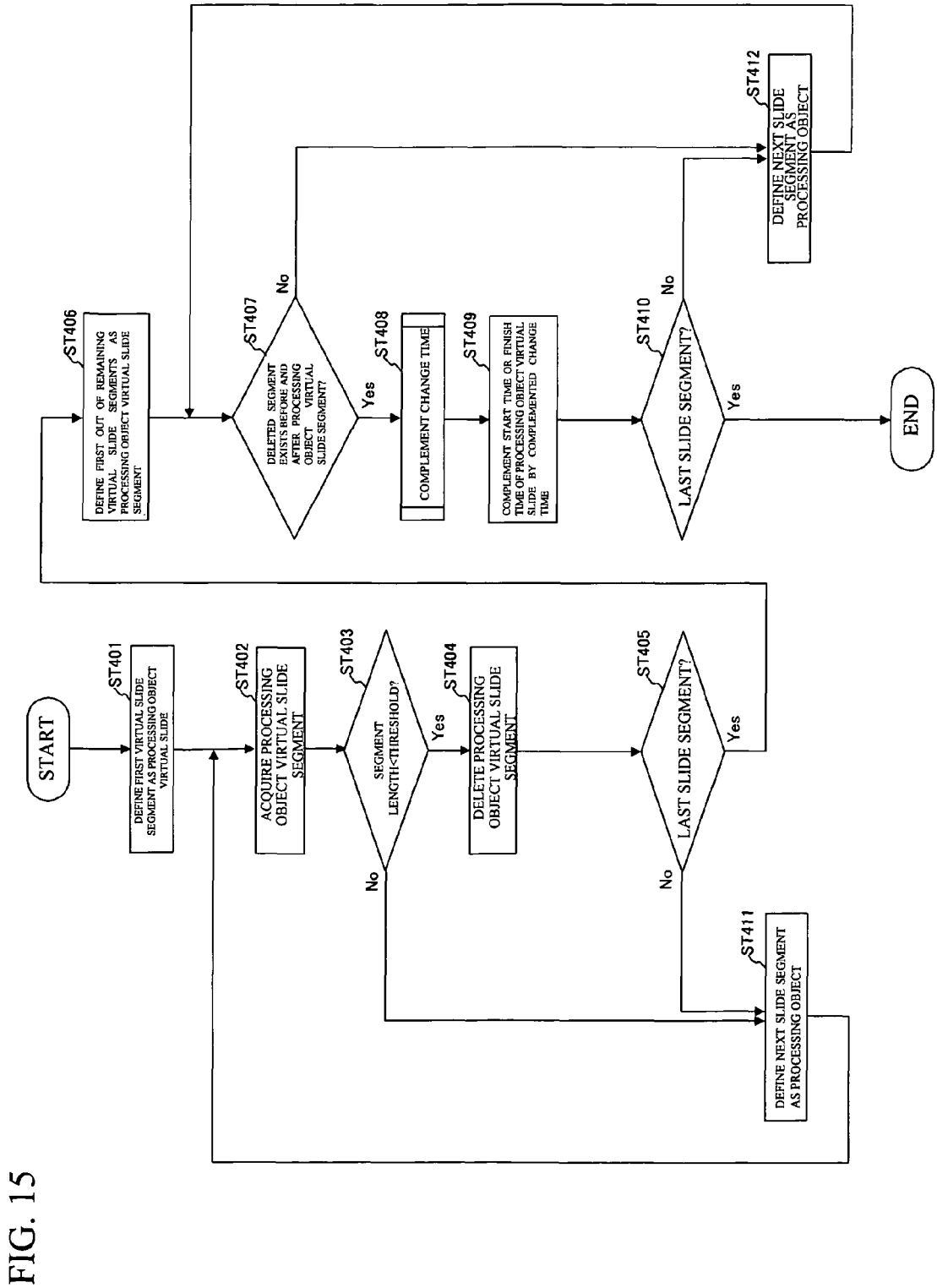
FIG. 15 is a flowchart showing input change complementary processing executed by the extraction section 150.

Next, a description will be given of the input change complementary processing of step ST209 shown in FIG. 11 with reference to FIG. 15. FIG. 15 is a flowchart showing the input change complementary processing executed by the extraction section 150.

Firstly, the extraction section 150 defines the first virtual slide segment as a processing object (step ST401). Next, the extraction section 150 acquires the processing object virtual slide segment (step ST402). After that, the extraction section 150 determines whether or not a length of the processing object virtual slide segment is smaller than a given threshold (step ST403). When it is determined that the length of the processing object virtual slide segment is smaller than the given threshold, the extraction section 150 executes processing of step ST404. Otherwise, the extraction section 150 executes processing of ST411.

When it is determined that the length of the processing object virtual slide segment is smaller than the given threshold in step ST403, the extraction section 150 deletes the processing object virtual slide (step ST404).

As an example, it is a rare case where a statement is made in a time segment in which the change time and the separation time are approximate to each other. By deleting such a segment, it becomes difficult to create a difference between an extracted recorded time segment and a time segment to be recorded as a minutes actually.

Next, the extraction section 150 determines whether or not the processing object slide segment is the last slide segment of a slide stream for a processing object (step ST405). When it is determined that the processing object slide segment is the last slide segment, the extraction section 150 executes processing of step ST406. Otherwise, the extraction section 150 executes processing of step ST411.

When it is determined that the processing object slide segment is the last slide segment of the slide stream for a processing object in step ST405, the extraction section 150 defines the first slide segment out of remaining virtual slide segments not deleted in step ST404 as a processing object virtual slide segment (step ST406).

Next, the extraction section 150 determines whether or not a deleted segment exists before and after the processing object virtual slide segment (step ST407). When it is determined that a deleted segment exists, the extraction section 150 executes step ST408. Otherwise, the extraction section 150 executes processing of step ST412.

When it is determined that a deleted segment exists before and after the processing object virtual slide segment in step ST407, the extraction section 150 complements a change time related to the deleted segment (step ST408). The complementary processing using an average value in the complementary processing of a change time has been described with reference to FIG. 4. Meanwhile, the complementary processing using a deviation rate has been described with reference to FIG. 8. Therefore, descriptions thereof will be omitted.

As an example, it is a rare case where a statement is made in a time segment in which the change time and the separation time are approximate to each other. Further, with the above-described configuration, a recorded time segment can be extracted based on a complemented change time. Therefore, as an example, as compared to an apparatus in which a recorded time segment is extracted based on an uncomplemented change time and a separation time, there is no possibility of extracting a segment in which a statement or the like is rarely made. Thus, it becomes difficult to create a difference between an extracted recorded time segment and a time segment to be recorded as minutes actually.

Next, the extraction section 150 corrects the start time or the finish time of the processing object virtual slide segment by the change time obtained by complementing the time of the deleted adjacent virtual slide segment in step ST408 (step ST409).

Next, the extraction section 150 determines whether or not the processing object slide segment is the last slide segment of the slide stream for a processing object (step ST410). When it is determined that the processing object slide segment is the last slide segment, the extraction section 150 ends the processing. Otherwise, the extraction section 150 executes processing of step ST412.

When it is determined that the length of the processing object virtual slide segment is not smaller than the given threshold in step ST403, or when it is determined that the processing object slide segment is not the last slide segment of the slide stream for a processing object in step ST405, the extraction section 150 defines the next slide segment as a processing object slide segment (step ST411). After that, the flow is returned to step ST402, and the above-described processing is repeated.

When it is determined that a deleted segment does not exist before and after the processing object virtual slide segment in step ST407, or when it is determined that the processing object slide segment is not the last slide segment of the slide stream for a processing object in step ST410, the extraction section 150 defines that the next slide segment as a processing object slide segment (step ST412). After that, the flow is returned to step ST407, and the above-described processing is repeated.

Next, the extraction section 150 creates a tentative recorded time segment as a recorded time segment, which is tentatively obtained based on the minutes information input segment by the virtual slide segment creation control processing. Then, the extraction section 150 divides the tentative recorded time segment by the corrected virtual slide segment. After that, the extraction section 150 extracts only the head segment of the divided tentative recorded time segment as a recorded time segment.

Figure 16:
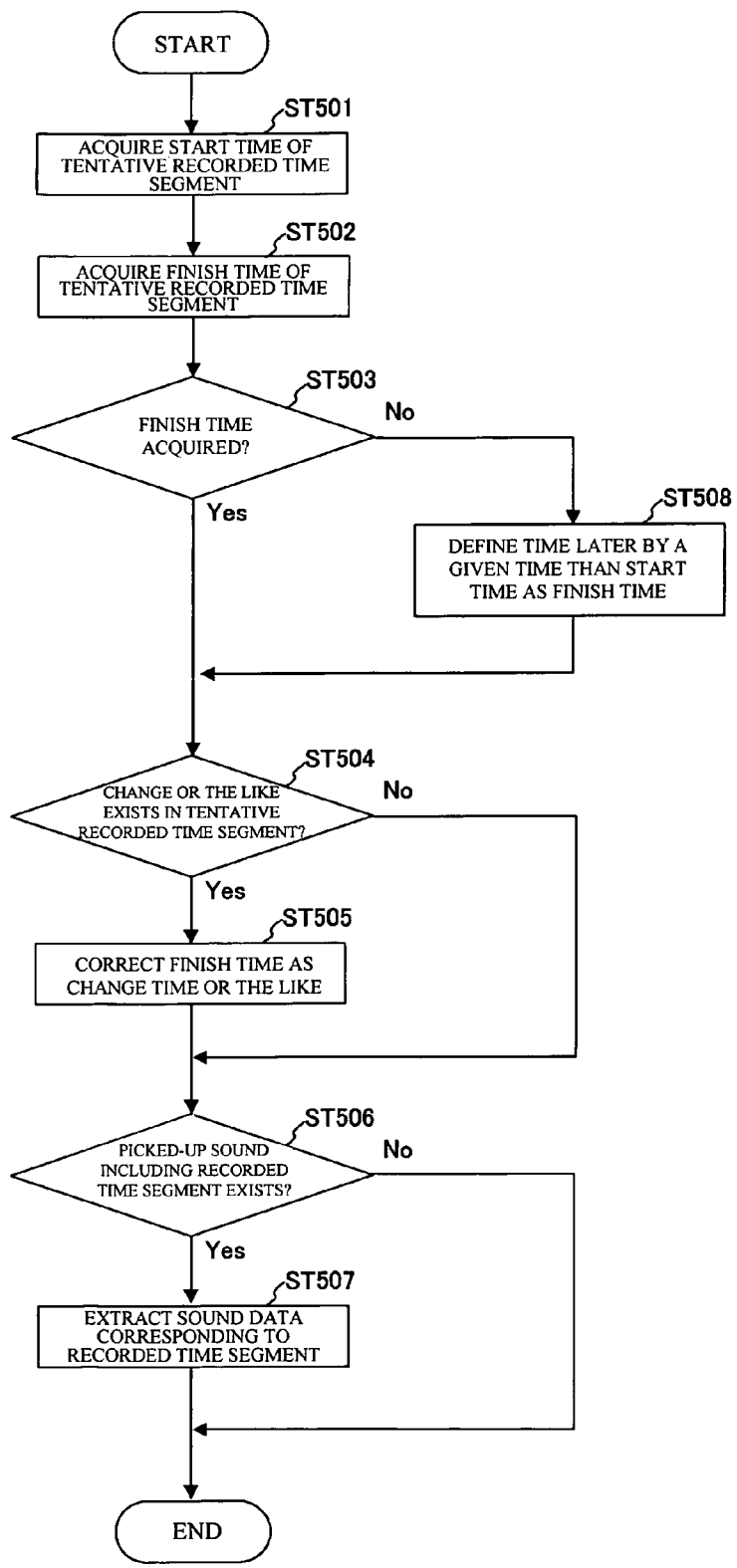
FIG. 16 is a flowchart showing recorded time segment extraction processing executed by the extraction section 150.

Next, a description will be given of processing for extracting a recorded time segment, which is executed by the extraction section 150 (hereinafter, simply referred to as recorded time segment extraction processing) with reference to FIG. 16. FIG. 16 is a flowchart showing the recorded time segment extraction processing executed by the extraction section 150.

Firstly, the extraction section 150 acquires a start time of a tentative recorded time segment (step ST501). Next, the extraction section 150 acquires a finish time of the tentative recorded time segment (step ST502).

Next, the extraction section 150 determines whether or not the finish time of the tentative recorded time segment has been acquired (step ST503). When it is determined that the finish time of the tentative recorded time segment has been acquired, the extraction section 150 executes processing of step ST504. Otherwise, the extraction section 150 executes processing of step ST508.

When it is determined that the finish time of the tentative recorded time segment has been acquired, or after the extraction section 150 executes step ST508, the extraction section 150 determines whether or not a segment separation of a corrected virtual slide (that is, a complemented change or a separation) exists in the tentative recorded time segment (step ST504). When it is determined that the segment separation of the corrected virtual slide exists in the tentative recorded time segment, the extraction section 150 executes processing of step ST505. Otherwise, the extraction section 150 executes processing of step ST506.

When it is determined that the segment separation of the corrected virtual slide exists in the tentative recorded time segment in step ST504, the extraction section 150 extracts a recorded time segment by correcting the finish time of the tentative recorded time segment as the complemented segment separation time of the virtual slide (step ST505).

As an example, a statement or the like to be recorded as minutes information is made on a content with a separation of an image displayed changeably. Therefore, with the configuration, a recorded time segment in which the separation is defined based on both a change time and a separation time can be extracted. As a result, it becomes difficult to create a difference between the extracted recorded time segment and a time segment to be recorded as minutes information actually.

Further, as an example, a statement or the like to be recorded as minutes information is made on a content with separations of a displayed image. Therefore, with the configuration, it is possible to extract a recorded time segment separated by a separation time. As a result, it becomes difficult to create a difference between the extracted recorded time segment and a time segment to be recorded as minutes information actually.

When it is determined that the change separation of the corrected virtual slide does not exist in the tentative recorded time segment in step ST504, or after the extraction section 150 executes step ST505, the extraction section 150 determines whether or not picked-up sound corresponding to the extracted recorded time segment is accumulated in the database 180 (step ST506). When it is determined that picked-up sound corresponding to the extracted recorded time segment is accumulated in the database 180, the extraction section 150 executes processing of step ST507. Otherwise, the extraction section 150 ends the processing.

When it is determined that picked-up sound corresponding to the recorded time segment is accumulated in the database 180 in step ST506, the extraction section 150 extracts the picked-up sound accumulated in the database 180 corresponding to the recorded time segment, and accumulates the recorded time segment, the minutes information, and the picked-up sound in association with each other in the database 180.

When it is determined that the finish time of the tentative recorded time segment has not been acquired in step ST503, the extraction section 150 defines a time later by a given time than the start time of the tentative recorded time segment as a finish time (step ST508). After that, the extraction section 150 executes processing of step ST504.

Figure 17:
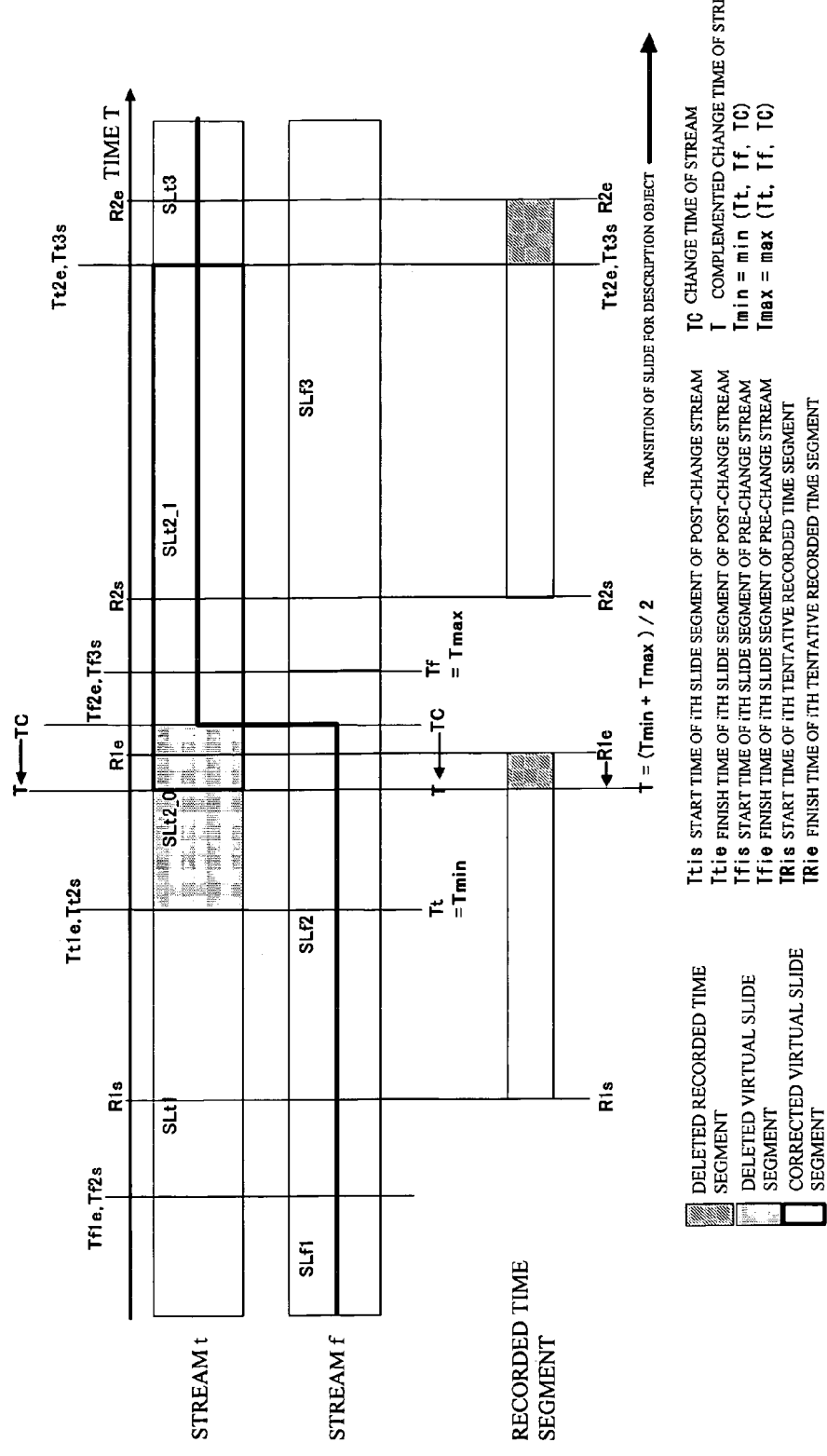
FIG. 17 is a diagram for explaining a relation among a tentative recorded time segment, a recorded time segment, and a slide segment.

Next, a description will be given again of the recorded time segment extraction processing described in FIG. 16 with reference to FIGS. 17 and 18. FIG. 17 is a diagram for explaining a relation among a tentative recorded time segment, a recorded time segment, and a slide segment.

The change time TC is not included in tentative recorded time segment (R1s, R1e) extracted by the extraction section 150 shown in FIG. 17. Since a segment length of virtual slide segment SLt2_0 does not meet a given segment length in the input change complementary processing described by using FIG. 15, the extraction section 150 deletes the virtual slide segment SLt2_0 (step ST404).

Therefore, as a result of executing complementary processing based on an average value, the change time TC is complemented as the complemented change time T included in the tentative recorded time segment (R1s, R1e) (step ST408). After that, the extraction section 150 corrects a start time of virtual slide segment SLt2_1 adjacent to the deleted virtual slide segment SLt2_0 as the complemented change time T (step ST409).

The extraction section 150 judges that the complemented change time T is included in the tentative recorded time segment (R1s, R1e) (step ST504), corrects finish time of the tentative recorded time segment, R1e as the complemented change time T, and extracts recorded time segment (R1s, T) (step ST505).

Further, the extraction section 150 determines that tentative recorded time segment (R2s, R2e) extracted by the extraction section 150 includes separation time Tt2e (step ST504). Then, the extraction section 150 corrects finish time of the tentative recorded time segment R2e into the change time Tt2e, and thereby extracts recorded time segment (R2s, change time Tt2e) (step ST505).

Figure 18:
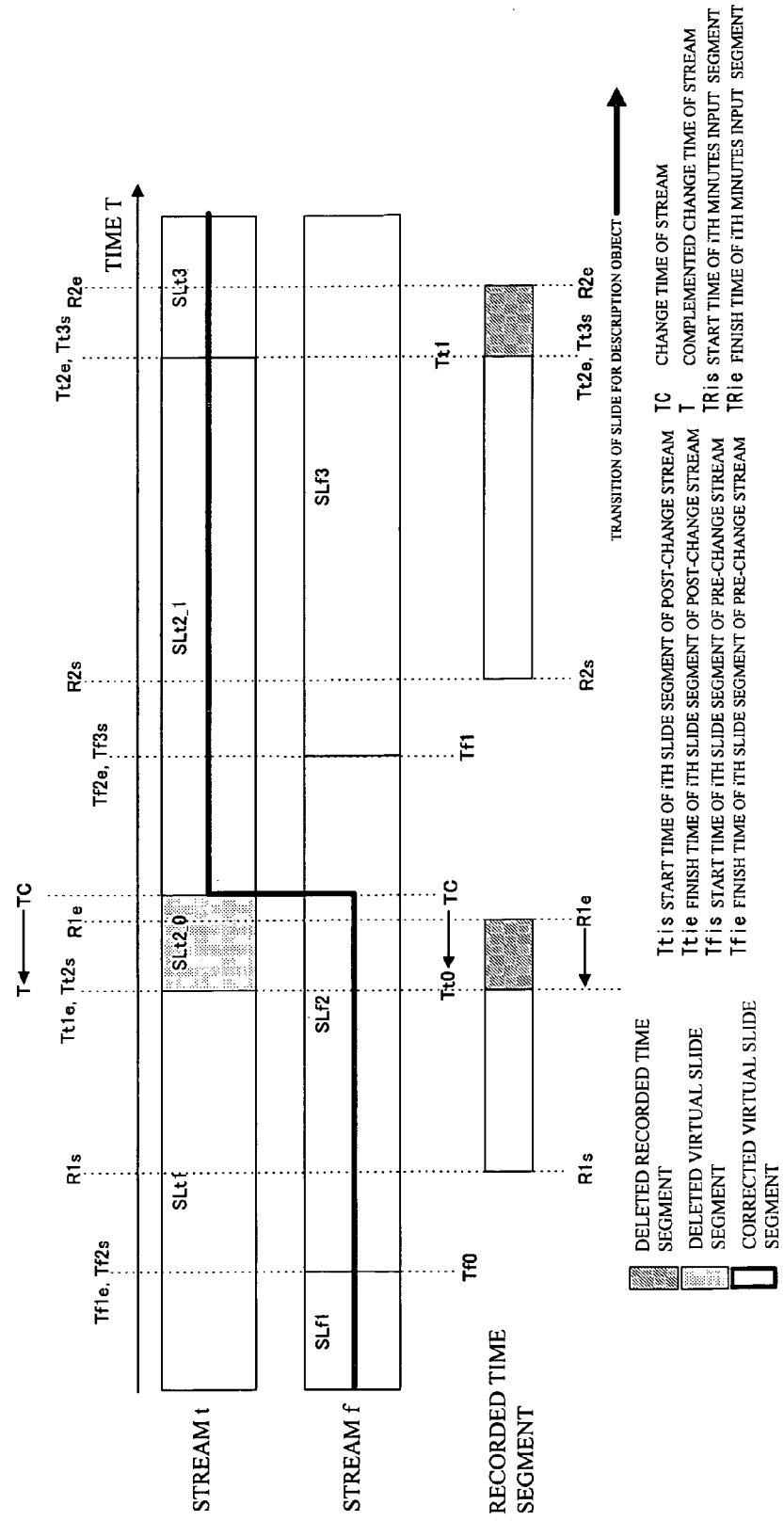
FIG. 18 is a diagram for explaining another relation among a tentative recorded time segment, a recorded time segment, and a slide segment.

Further, tentative recorded time segments (R1s, R1e) extracted by the extraction section 150 shown in FIG. 18 do not include the change time TC as well. Then, since the segment length of the virtual slide segment SLt2_0 does not meet the given segment length in the input change complementary processing described by using FIG. 15, the extraction section 150 deletes the virtual slide segment SLt2_0 as in FIG. 17 (step ST508).

Next, differently from FIG. 17, complementary processing is executed based on a deviation rate. As a result, the change time TC is complemented as the complemented change time T included in the tentative recorded time segment (R1s, R1e) (step ST408). After that, as in FIG. 17, the extraction section 150 corrects the start time of the virtual slide segment SLt2_1 adjacent to the deleted virtual slide segment SLt2_0 as the complemented change time T (step ST409).

Again, as in FIG. 17, the extraction section 150 corrects the finish time of the tentative recorded time segment, R1e as the complemented change time T, and thereby extracts the recorded time segment (R1s, T) (step ST505).

For the tentative recorded time segment (R2s, R2e) extracted by the extraction section 150, the processing thereof is similar to that of the example of FIG. 17. Therefore, the description thereof will be omitted.

A description will be continuously given of the structure of the minutes taking apparatus 100 with reference to FIG. 1 again.

The database 180 is composed of, for example, a relational database. The database 180 is connected to the accumulation section 130, the control section 140, the extraction section 150, and the delivery section 170.

The database 180 accumulates slide data, a separation time, and projector identification information which are associated with each other by the accumulation section 130.

Further, the database 180 accumulates a captured image, camera identification information, and time information which are associated with each other by the accumulation section 130.

Further, the database 180 accumulates picked-up sound and microphone identification information thereof and time information which are associated with each other by the accumulation section 130.

Further, the database 180 accumulates a minutes information input segment and a minutes which are associated with each other by the accumulation section 130.

Further, the database 180 accumulates a change time, pre-change camera identification information, and post-change camera identification information which are associated with each other by the accumulation section 130.

The database 180 accumulates projector identification information of a projector which projects a slide for a description object, microphone identification information of a microphone arranged so that sound of a participant describing the slide can be picked up, camera identification information of a video camera arranged so that the projected slide or the participant describing the slide can be captured in association with each other.

Thereby, it is possible to associate post-change slide data for a description object (hereinafter, simply referred to as post-change slide data) and sound describing the post-change slide data based on post-change camera identification information.

Further, the database 180 accumulates information for identifying a conference participant (hereinafter, simply referred to as participant identification information), personal information of the participant such as a name, a terminal (hereinafter, simply referred to as terminal) for generally receiving a delivered minutes (hereinafter, simply referred to as delivery minutes), and a mail address for receiving the delivery minutes (hereinafter, simply referred to as receiving address) in association with each other.

Further, the database 180 accumulates information for identifying the clerk 300 and a mail address for transmitting the delivery minutes (hereinafter, simply referred to as transmitting address) in association with each other.

Further, the database 180 accumulates conference identification information, bibliography information of a conference (hereinafter, simply referred to as conference bibliography information), and participant identification information of a conference participant in association with each other. The conference bibliography information denotes memorandum information previously describing a conference name, a place, a conference time, participants, an agenda or the like.

The name of a participant, the receiving address, the transmitting address, the conference bibliography information and the like which are accumulated in the database 180 are referred to by the control section 140. Furthermore, the slide data, the picked-up sound, the captured image or the like which are accumulated in the accumulation section 130 are referred to by the delivery section 170.

The delivery minutes taking section 160 is connected to the control section 140 and the delivery section 170. The delivery minutes taking section 160 acquires the receiving address, the transmitting address, the minutes bibliography information, the minutes, the delivery minutes information or the like from the control section 140.

Then, the delivery minutes taking section 160 takes the delivery minutes based on the delivery minutes information received from the control section 140. After that, the delivery minutes taking section 160 transmits the taken delivery minutes to the control section 140 and the delivery section 170. The delivery minutes is composed of, for example, a structured document such as HTML, and delivered as e-mail.

In accordance with the structure, a minutes for delivery can be taken based on an already taken minutes. Therefore, as an example, as compared to the case that a minutes for delivery is taken not based on an already taken minutes, it is possible to reduce workload by a clerk necessary for taking the minutes.

The delivery section 170 is connected to the control section 140, the delivery minutes taking section 160, and the accumulation section 130. The delivery section 170 receives the delivery minutes from the delivery minutes taking section 160. After that, the delivery section 170 receives a delivery command from the control section 140, and delivers the delivery minutes through the network 500.

The delivery minutes composed of a structured document is accessibly linked to slide data for a description object in a recorded time segment as an object on which a comment is particularly recorded out of delivery minutes information of the delivery minutes, picked-up sound, and a captured image, which are the slide data, the picked-up sound, and the captured image accumulated in the database 180 of the minutes taking apparatus 100.

Therefore, when a participant of a conference receiving delivery of the delivery minutes refers to the link in the terminal operated by the participant, the participant can acquire the slide data for a description object in the recorded time segment, the picked-up sound, and the captured image accumulated in the database 180 of the minutes taking apparatus 100 through the delivery section 170, and see and hear the acquired information.

With the configuration, the delivery minutes and a displayed image such as slide data used in a conference in a recorded time segment, sound in the conference, or a video image in the conference are associated as a link. Therefore, while increase of delivered minutes data is inhibited, complementary information as contents information can be added to the minutes.

Figure 19:
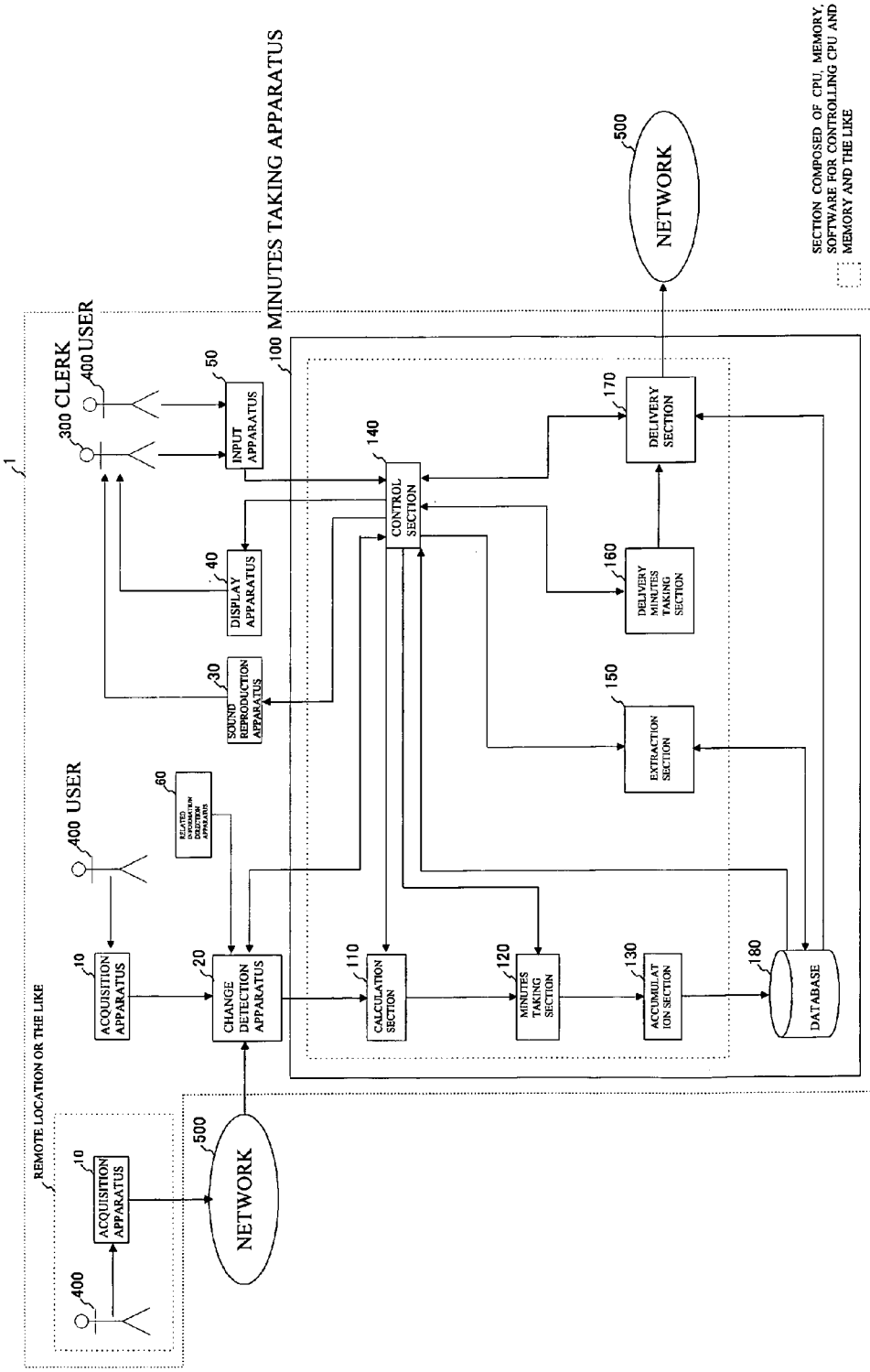
FIG. 19 is a structural diagram of a minutes taking system in accordance with another exemplary embodiment of the invention.

A description will be given of a structural diagram of a minutes taking system in accordance with another exemplary embodiment of the invention with reference to FIG. 19. FIG. 19 is a structural diagram of the minutes creation system in accordance with another exemplary embodiment of the invention.

The structure of the minutes taking system is almost identical with the structure of the minutes taking system illustrated in FIG. 1, except that the minutes taking system in this exemplary embodiment includes a related information direction apparatus 60.

Since connections and functions of the acquisition apparatus 10 are identical with those of the acquisition apparatus 10 composing the minutes taking system illustrated in FIG. 1, the description thereof will be omitted.

The change detection apparatus 20 composing the minutes taking system illustrated in FIG. 1 changes a captured image obtained by capturing a slide for a description object. Meanwhile, the change detection apparatus 20 of this minutes taking system changes picked-up sound describing a slide for a description object.

Further, the change detection apparatus 20 composing the minutes taking system illustrated in FIG. 1 detects a change of a slide for a description object based on a change of a captured image obtained by capturing a slide to be transmitted to the control section 140. Meanwhile, the change detection apparatus 20 of this minutes taking system detects a change based on a change of picked-up sound.

Connection of the change detection apparatus 20 is almost identical with that of the acquisition apparatus 10 composing the minutes taking system illustrated in FIG. 1, except that the change detection apparatus 20 is connected to the related information direction apparatus 60.

Further, as the change detection apparatus 20 illustrated in FIG. 1, the change detection apparatus 20 of this exemplary embodiment receives a command to direct a change and camera identification information of a post-change camera from the control section 140. After that, the change detection apparatus 20 transmits the camera identification information to the related information direction apparatus 60, and acquires microphone identification information in association with the camera identification information.

Subsequently, the change detection apparatus 20 changes picked-up sound which is picked up by a microphone arranged to be able to pick up sound describing a slide for a description object (hereinafter, simply referred to as pre-change microphone) to picked-up sound which is picked up by a microphone arranged to be able to pick up sound describing a slide for a description object (hereinafter, simply referred to as post-change microphone), and transmits the post-change picked-up sound to the control section 140. Therefore, the change detection apparatus 20 detects that a displayed image for a description object is changed by the change of picked-up sound.

Then, the change detection apparatus 20 transmits microphone identification information of the pre-change microphone (hereinafter, simply referred to as pre-change microphone identification information), microphone identification information of the post-change microphone (hereinafter, simply referred to as post-change microphone identification information), and a signal indicating that the change is detected (hereinafter, simply referred to as change signal) in association with each other to the calculation section 100. It is also possible to adopt a structure that a change time as a time when the change is detected is transmitted instead of the change signal.

The related information direction apparatus 60 is connected to the change detection apparatus 20. The related information direction apparatus 60 stores camera identification information of a camera arranged so that a projected slide for a description object can be captured, and microphone identification information of a microphone arranged so that the description can be picked up in association with each other.

The related information direction apparatus 60 receives the camera identification information from the change detection apparatus 20. The related information direction apparatus 60 transmits the microphone identification information in association with the previously stored camera identification information to the change detection apparatus 20.

Connections, structures and the like of the sound reproduction apparatus 30, the display apparatus 40, the input apparatus 50, the minutes taking apparatus 100, the calculation section 110, the minutes taking section 120, the accumulation section 130, the control section 140, the extraction section 150, the delivery minutes taking section 160, the delivery section 170, and the database 180 are similar to those illustrated in FIG. 1. Therefore, descriptions thereof will be omitted.

Whereas in the above-described exemplary embodiments, the description has been given of the case that only one delivery minutes is taken for a taken minutes, the invention not limited thereto. It is possible to adopt a configuration that multiple delivery minutes different based on delivery destinations of the delivery minutes are taken by controlling so that, for example, the control section 140 refers to divisions of participants of a conference from the database 180, and the delivery minutes taking section 160 takes delivery minutes only from minutes information related to the divisions of the participants of the conference.

Whereas in the above-described exemplary embodiments, the description has been given of the case using a CCD camera, the invention is not limited thereto. For example, it is possible to adopt a camera or the like using a CMOS image sensor.

Whereas in the above-described exemplary embodiments, the description has been given of the case where the multiple video cameras 13 for capturing slides projected by the multiple projectors 11, or the microphone 12 for picking up a description sound is changed by the change detection apparatus 20, the invention is not limited thereto. For example, it is possible to adopt a configuration that one projector 11 is connected to multiple computers via the change detection apparatus 20. Thereby, the change detection apparatus 20 can change a computer for outputting a slide for a description object, and in addition, can detect a change of the description object.

A minutes taking method employed as an aspect of the present invention is realized with a Central Processing Unit (CPU), Read Only Memory (ROM), Random Access Memory (RAN), and the like, by installing a program from a portable memory, device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A minutes taking system comprising:
    a change detection portion that detects a change of a displayed image for a description object out of displayed images that are a plurality of stream images serving as information displayed in a conference;
    a separation detection portion that detects a separation temporally separates a content of the displayed image;
    an extraction portion that extracts a recorded time segment to be recorded as minutes information composing a minutes, on the basis of a change time when the change detection portion detects the change of the displayed image for the description object and a separation time when the separation detection portion detects the separation according to the plurality of streams; and
    an accumulation portion that accumulates the minutes information recording data corresponding to the recorded time segment extracted by the extraction portion.

2. The minutes taking system according to claim 1, wherein the extraction portion extracts the recorded time segment which is separated by a complemented change time as a change time obtained by complementing the change time based on the separation time.

3. The minutes taking system according to claim 2, wherein the complemented change time is a time that satisfies:

$T=(T\min+T\max)/2$, where TC represents the change time, Tf represents a separation time of a pre-change displayed image which is closest to TC, Tt represents a separation time of a post-change displayed image which is closest to TC, Tmin represents an earliest time out of TC, Tf, and Tt, and Tmax represents a latest time out of TC, Tf, and Tt.

4. The minutes taking system according to claim 2, wherein the complemented change time is a time that satisfies:

$T=Tf1$ $df<dt$ $df=|TC-Tf1|/|Tf1-Tf0|$ $dt=|TC-Tt0|/|Tt1-Tt0|$, where TC represents the change time, Tf1 represents a separation time of a pre-change displayed image which is closest to TC, Tf0 represents a separation time of the pre-change displayed image which is closest to Tf1 and earlier than Tf1, Tt0 represents a separation time of a post-change displayed image which is closest to TC, and Tt1 represents a separation time of the post-change displayed image which is closest to Tf0 and later than Tt0.

5. The minutes taking system according to claim 2, wherein the complemented change time is a time that satisfies:

$T=Tt0$ $df>=dt$ $df=|TC-Tf1|/|Tf1-Tf0|$ $dt=|TC-Tt0|/|Tt1-Tt0|$ where TC represents the change time, Tf1 represents a separation time of a pre-change displayed image which is closest to TC, Tf0 represents a separation time of the pre-change displayed image which is closest to Tf1 and earlier than Tf1, Tt0 represents a separation time of a post-change displayed image which is closest to TC, and Tt1 represents a separation time of the post-change displayed image which is closest to Tf0 and later than Tt0.

6. The minutes taking system according to claim 1, wherein the extraction portion extracts the recorded time segment that is separated on the basis of the separation time.

7. The minutes taking system according to claim 1, wherein:
the displayed image includes slide data displayed in the conference; and
the separation detection portion detects a change time of displaying the slide data as a separation time.

8. The minutes taking system according to claim 1 further comprising:
a slide data acquisition portion that acquires the slide data used in the conference, the slide data being included in the displayed image, wherein
the accumulation portion accumulates the minutes information recording the recorded time segment extracted by the extraction portion, and the slide data which is acquired by the slide data acquisition portion and which has been displayed in the recorded time segment extracted by the extraction portion in association with each other.

9. The minutes taking system according to claim 1 further comprising:
a sound pick-up portion that picks up sound in the conference, wherein
the accumulation portion accumulates the minutes information recording the recorded time segment extracted by the extraction portion and the sound picked up by the pick-up portion in the recorded time segment extracted by the extraction portion in association with each other.

10. The minutes taking system according to claim 1 further comprising:
a capturing portion that shoots an image in the conference, wherein
the accumulation portion accumulates the minutes information recording the recorded time segment extracted by the extraction portion and the image captured by the capturing portion in the recorded time segment extracted by the extraction portion in association with each other.

11. The minutes taking system according to claim 8 further comprising a sound pick-up portion that picks up sound in the conference,
wherein the accumulation portion also accumulates the sound picked up by the pick-up portion in the recorded time segment extracted by the extraction portion in association with each other.

12. The minutes taking system according to claim 11 further comprising a capturing portion that shoots an image in the conference,
wherein the accumulation portion also accumulates the image captured by the capturing portion in the recorded time segment extracted by the extraction portion in association with each other.

13. The minutes taking system according to claim 12 further comprising:
a delivery minutes taking portion that takes a delivery minutes composed of minutes information for a delivery object out of the minutes information composing the minutes accumulated by the accumulation portion; and
a delivery portion that delivers the delivery minutes taken by the delivery minutes taking portion.

14. The minutes taking system according to claim 12, wherein the delivery minutes delivered by the delivery portion has a link accessible to one or more of a displayed image, picked-up sound, and a captured image which are accumulated in the accumulation portion in association with a recorded time segment to be recorded as the minutes information composing the delivery minutes.

15. The minutes taking system according to claim 1 further comprising:
a delivery minutes taking portion that takes a delivery minutes composed of minutes information for a delivery object out of the minutes information composing the minutes accumulated by the accumulation portion; and
a delivery portion that delivers the delivery minutes taken by the delivery minutes taking portion.

16. The minutes taking system according to claim 1, wherein:
the displayed images that are a plurality of stream images are image data of the plurality of streams to be displayed on a plurality of display screens; and
the displayed images are individual slides.

17. The minutes taking system according to claim 1, wherein:
the displayed images that are a plurality of stream images are image data of the plurality of streams to be projected on a plurality of display screens, and
the displayed images are individually projected slides.

18. A minutes taking method comprising:
detecting a change of a display object of displayed images serving as information displayed in a conference;
detecting a separation time temporally separating a content of the displayed image;
extracting a recorded time segment to be recorded as minutes information composing a minutes, on the basis of a detected change time and the detected separation time; and
accumulating the minutes information recording data corresponding to the recorded time segment extracted by the extracting step.

19. A non-transitory computer readable medium storing a computer readable program executable by a computer causing a computer to execute a process for minutes taking, the process comprising:
detecting a change of a display object of displayed images serving as information displayed in a conference;
detecting a separation time temporally separating a content of the displayed image;
extracting a recorded time segment to be recorded as minutes information composing a minutes, on the basis of a detected change time and the detected separation time; and
accumulating the minutes information recording data corresponding to the recorded time segment extracted by the extracting step.

* * * * *